United States Patent
Freedy et al.

(10) Patent No.: US 7,321,883 B1
(45) Date of Patent: Jan. 22, 2008

(54) FACILITATOR USED IN A GROUP DECISION PROCESS TO SOLVE A PROBLEM ACCORDING TO DATA PROVIDED BY USERS

(75) Inventors: Amos Freedy, Encino, CA (US); Marvin Cohen, Arlington, VA (US); Elan Freedy, Fairfax, VA (US); Gershon Weltman, Sherman Oaks, CA (US); James McDonough, Newbury Park, CA (US)

(73) Assignee: Perceptronics Solutions, Inc., Sherman Oaks, CA (US)

( * ) Notice: Subject to any disclaimer, the term of this patent is extended or adjusted under 35 U.S.C. 154(b) by 0 days.

(21) Appl. No.: 11/498,884

(22) Filed: Aug. 4, 2006

Related U.S. Application Data

(60) Provisional application No. 60/705,487, filed on Aug. 5, 2005.

(51) Int. Cl.
*G06F 17/00* (2006.01)
*G06N 5/00* (2006.01)
(52) U.S. Cl. .............................. 706/45; 706/46; 706/61
(58) Field of Classification Search ................. 706/45, 706/46, 61
See application file for complete search history.

(56) References Cited

U.S. PATENT DOCUMENTS

| | | | |
|---|---|---|---|
| 6,876,991 B1 * | 4/2005 | Owen et al. ................... | 706/46 |
| 7,127,478 B1 * | 10/2006 | Schoenwolf et al. ........ | 707/204 |
| 2003/0078900 A1 * | 4/2003 | Dool ........................... | 706/18 |
| 2004/0103058 A1 * | 5/2004 | Hamilton ..................... | 705/38 |
| 2006/0074980 A1 * | 4/2006 | Sarkar ...................... | 707/104.1 |
| 2006/0184482 A1 * | 8/2006 | Flinn et al. ................... | 706/45 |
| 2006/0230109 A1 * | 10/2006 | Lee et al. .................... | 709/205 |

OTHER PUBLICATIONS

James G. McDonough, Elan Freedy, Marvin Cohen, Terry Padgett and Gershon Weltman, Tactical Group Decision Analysis (TGDAS) For Distributed, Collaborative Planning and Support, Mar. 14, 2005, pp. 1-30.*

(Continued)

*Primary Examiner*—Thomas Lee
*Assistant Examiner*—Jaweed A Abbaszadeh
(74) *Attorney, Agent, or Firm*—Stein, McEwen & Bui, LLP

(57) ABSTRACT

An automated facilitator for use in structuring a group decision process using end user collaboration units through which corresponding stories are entered and feedback is provided, the facilitator including at least one database which stores models for problem solving; and at least one automated facilitation server which receives information on a problem to be resolved, receives the stories from the collaboration end units relating to the problem to form a story matrix, translates the story matrix into an influence diagram and/or decision tree displayed on the end user collaboration units using the stored models, provides alerts of divergences to be resolved by the end user collaboration units to resolve the problem according to the stored models, updates the displayed influence diagrams and decision trees according to feedback received from the user collaboration units due to the alert using the stored models, and provides a best solution based upon the updates which indicates a sensitivity of the solution to changes in parameters of the story matrix.

26 Claims, 16 Drawing Sheets

OTHER PUBLICATIONS

Kargupta, H.; Dutta, H., "Orthogonal decision trees," Data Mining, 2004. ICDM 2004. Proceedings. Fourth IEEE International Conference on , pp. 427-430, Nov. 1-4, 2004☐☐.*

Information Technology Augmentation of the Skilled Facilitator Approach. Adkins, M.; Younger, R.; Schwarz, R. System Sciences, 2003. Proceedings of the 36th Annual Hawaii International Conference on, vol., Iss., Jan. 6-9, 2003, pp. 1-10.*

A Model for Fuzzy Temporal Knowledge Representation and Reasoning. Ribaric, S.; Dalbelo Basic, B.; Pavesic, N. Fuzzy Systems Conference Proceedings, 1999. FUZZ-IEEE '99. 1999 IEEE International, vol. 1, Iss., 1999, pp. 216-221.*

William A. Flexner and Kimbal L. Wheatly, "Chapter 7B—When You Really Must Have Them: Face-to-Face Meetings Using Keypad Electronics Meeting Systems" in Coleman, D. (ed). *Groupware*, Prentice Hall, (Upper Saddle River, NJ; 1997) pp. 193-205.

Donald L. Keefer, Craig W. Kirkwood, and James L. Corner, "Summary of Decision Analysis Applications in the Operations Research Literature, 1990-2001," Technical Report—Department of Supply Chain Management, Arizona State University, Nov. 2002.

Zachary Wong and Milam Aiken, "Automated Facilitation of Electronic Meeting," *Information and Management* vol. 4-2, Dec. 2003.

Tania Ho and Pedro Antunes, "Developing a Tool to Assist Electronic Facilitation of Decision-Making Groups," Department of Infomatic Engineering, IST, Technical University of Lisbon (2002).

Ana V. Lopez, Queen Booker, Natallya S. Shkarayeva, Robert O. Briggs, and Jay F. Nunamaker, Jr., "Embedding Facilitation in Group Support Systems to Manage Distributed Group Behavior," Proceedings of the 35th Hawai'i International Conference on System Sciences (2002).

Amos Freedy, Yee-Yeen Chu, and Jackie Zev, "Final Technical Report: Computer-Aided Concurrent Engineering (CACE): A Modified Petri-Net Approach to Process Modeling and Control—Methodology and Tools (Phases 4 and 5)," Advanced Research Projects Agency Defense Sciences, Office ARPA Contract No. MO46/03-92-C-0129, Reporting Period Nov. 1992-Sep. 1995.

Simon S. K. Lam, "The Effects of Group Decision Support Systems and Task Structures on Group Communication and Decision Quality," *Journal of Management Information Systems*, vol. 13, Spring (1997) pp. 193-215.

Marvin S. Cohen, Jared T. Freeman, and Bryan Thompson, "Critical Thinking Skills in Tactical Decision Making: A Model and a Training Strategy," ed. J.A. Cannon-Bowers and E. Salas, American Psychological Association, WDC.

Professor Larry Phillips, "Decision Conferencing: White Paper," *Catalyze, Ltd.* Mar. 2005 from Web Archive.

Daniel Tabak and Alexander H. Levis, "Petri Net Representation of Decision Models" Technical Report, ONR Contract N0014-83-K-0185, Laboratory for Information and Decision Systems, Massachusetts Institute of Technology (MIT) Jun. 1984.

Ralph L. Keeney and Howard Raiffa, *Decisions with Multiple Objectives: Preference Value Tradeoffs*, John Wiley & Sons (New York, NY; 1976) Sections 1.2, 1.3, 1.3.1 and 1.3.2.

Judea Pearl, "Section 6.2.3—Influence Diagrams," *Probalistic Reasoning in Intelligent Systems: Networks of Plausible Inference*, Morgan Kaufmann Publishers, Inc. (San Mateo, CA; 1989), pp. 306-311.

Raana Lipschitz and Marvin S. Cohen, "Warrants for Prescription: Analytically and Empirically Based Approaches to Improving Decision Making," *J Human Factors and Engineering Society* 47(1), pp. 121-130.

W.M.P. van der Aalst and A.H.M ter Hofstede, "Workflow Patterns: On the Expressive Power of (Petri-net-based) Workflow Language".

Richard E. Orwig, Hsinchun Chen, and Jay F. Nunamaker, Jr., "A Graphical, Self-Organizing Approach to Classifying Electronic Meeting Output," *Journal of the American Society for Information Science*, 48(2) (1997) pp. 157-170.

*The Principles and Applications of Decision Analysis*—vol. 2 : *Professional Collection*, ed. Ronald A. Howard and James E. Matheson, Strategic Decisions Group (Menlo Park, NJ; 1989) pp. 721-726.

Prakash P. Shenoy, "Valuation-Based Systems for Bayesian Decision Analysis" *Operations Research* vol. 40, No. 3 (May-Jun. 1992) pp. 463-484.

Amos Freedy, Randall Steeb, and Steven Johnson, "Chapter 8: A Computer-Based Interactive System for Group Decision Making in Crisis Management," *National Security Crisis Forecasting and Management*, ed. Gerald W. Hopple, Stepehen J. Andriole, and Amos Freedy, Westview Press (Boulder, CO. and London, UK; 1984) pp. 121-137.

Kneale T. Marshall and Robert M. Oliver, *Decision Making and Forecasting: With Emphasis on Model Building and Policy Analysis*, McGraw Hill, Inc. (New York, NY; 1995) Sections 1.4, 1.5, 1.5.1, 1.7.1, 1.7.2 and 1.8.

Efraim Turban and Jay E. Aaronson, "Chapter 10—Group Decision Support Systems," *Decision Support Systems and Intelligent Systems*, Prentice Hall (Upper Saddle River, NJ; 1988) pp. 348-359.

* cited by examiner

FACILITATOR USED IN A GROUP DECISION PROCESS TO SOLVE A PROBLEM ACCORDING TO DATA PROVIDED BY USERS

CROSS REFERENCE TO RELATED APPLICATION

This application claims priority from U.S. provisional application No. 60/705,487, filed Aug. 5, 2005, the disclosure of which is incorporated by reference.

STATEMENT REGARDING FEDERALLY SPONSORED RESEARCH OR DEVELOPMENT

This invention was made with Government support under Contract No. W31P4Q-05-C-R049 awarded by Defense Advanced Research Projects Agency (DARPA). The Government has certain rights in the invention.

BACKGROUND OF THE INVENTION

1. Field of the Invention

Aspects of the invention include a method and system to support distributed group decision analysis, and more particularly, to a method and system to support distributed group decision analysis in tactical situations using data structures and algorithms for representing individual contributions to group decision analysis and controlling the merging of the individual contributions into a consensus representation under the editorship of a human and/or an automatic decision maker decision-maker.

2. Description of the Related Art

There are numerous commercial GroupWare and GDSS (Group Decision Support) products which relate to providing aid to decision making. Examples of these products include Group System, Vision Quest, SAMM.TCB Works, Decision Explorer, Option Finder, Council, Meeting Works, and Catalyze. While the field of GDSS is committed to developing interactive computer-based systems which facilitate the solution of unstructured problems by decision makers working together as a team, the main disadvantage of prior and current GDSS has been that they attempt to enhance the effectiveness of decision groups primarily through interactive sharing of information among the group members. Accordingly, the focus of these systems is almost purely on facilitating group interaction, brainstorming and communication. Virtually no attention is paid to the underlying decision analytic principles or to supporting normative decision making.

The main disadvantage of such support systems that are devoted primarily to decision analytical calculations is that they typically focus only on this aspect and neglect the equally important cognitive aspects of decision making. As a result, the common disadvantages of prior decision analytical systems are (1) are typically difficult to use by anyone other than an expert in decision analysis, (2) are overly time consuming so that tactical decision makers are reluctant to apply them, (3) require the full time participation of a trained facilitator to guide the collaborative group through the analytical decision making process; and (4) do not bring the group to a final decision recommendation or result.

SUMMARY OF THE INVENTION

In order to solve these and/or other problems, aspects of the invention provide a comprehensive system for supporting real-time planning and decision-making that is easy to use by collaborative groups without the help of an expert facilitator and results in a final decision product.

According to an embodiment of the invention, a software system provides a model unit which provides multiple representational formalisms for capturing and modeling the cognitive processes of the individuals and groups; support tools to support the individual stakeholders in the decision making process and an access unit for supporting a process of automatic access to related tools, including support in a tactical decision context of commercial group-ware tools.

According to an aspect of the invention, the model unit provides multiple representational formalisms for capturing and modeling the cognitive processes of the individuals and groups for: problem presentation and structuring, conflicts in problem/situation understanding, identification of values conflicts, converging individual probabilities assortment and values into a normative group multi attribute decisions criteria, or combinations thereof.

According to an aspect of the invention, the support tools to support the individual stakeholders in the decision making process include: sensitivity analysis tools, option development, tools, organizational memory tools, external data base access tools, computational support Infrastructure tools, or combinations thereof.

According to an aspect of the invention, the access unit for supporting the process of automatic access to related tools includes support in a tactical decision context of commercial group-ware tools.

According to an aspect of the invention, the commercial group-ware tools include Group System, Vision Quest, SAMMTCB Works, Decision Explorer, Option Finder, Council, Meeting Works, Catalyze, or combinations thereof.

According to an embodiment of the invention, a software system provides a distributed infrastructure and user interface mechanisms to support real-time group decision analysis without the need for an expert facilitator and without any need for the participants to be in the same place at the same time.

According to an embodiment of the invention, the software system provides a distributed infrastructure and user interface mechanisms using a distributed architecture to support group interaction, a "model-centered process" to focus the group collaborative decision making process toward convergence, a methodology and software for automating the facilitator function, and cognitively-efficient individual and group information displays and protocols for group interaction and communication.

According to an embodiment of the invention, the cognitively efficient individual and group information displays and protocols for group interaction and communication includes distinctive displays of shared model components, methodology and mechanisms to support a mixed initiative dialogue, and analysis of how non-shared components are distributed among members, attention management to guide members' to relevant functions, and time and workflow management to reach a decision within a required timeframe.

According to an embodiment of the invention, a system includes mechanisms that support continuous tracking of real-world events and stakeholder revisions related to the decision so that the decision can be revisited when events indicate that the decision that has been taken is no longer optimal, the system implementing a post-decision continuous optimality evaluation process, representation of the optimality score for the group decision criteria, updating models via changes in probabilities, utilities and resources priorities, and group and stakeholder alerts for re-evaluating the decision.

According to an embodiment of the invention, an automated facilitator for use in structuring a group decision process using end user collaboration units through which corresponding stories are entered and feedback is provided, the facilitator comprising: at least one database which stores models for problem solving; and at least one automated facilitation server which receives information on a problem to be resolved, receives the stories from the collaboration end units relating to the problem to form a story matrix, translates the story matrix into an influence diagram and/or decision tree displayed on the end user collaboration units using the stored models, provides alerts of divergences to be resolved by the end user collaboration units to resolve the problem according to the stored models, updates the displayed influence diagrams and decision trees according to feedback received from the user collaboration units due to the alert using the stored models, and provides a best solution based upon the updates which indicates a sensitivity of the solution to changes in parameters of the story matrix.

According to an embodiment of the invention, the at least one automated facilitation server utilizes a Modified Petri Net formalism to resolve the problem.

According to an embodiment of the invention, the at least one database comprises an ontology knowledge database, and the at least one automated facilitation server includes a concept extraction tool to generate semantic mappings from textual data entered using the stories to domain an ontology which defines the decision problem space and which is used to generate a machine understandable knowledge representation stored in the ontology knowledge database.

According to an embodiment of the invention, the at least one automated facilitation server includes a module comprising a set of context aware agents and/or artificial intelligent (AI) utilities which use the ontology knowledge database to aid the end user collaboration units to eliminate options within the decision tree.

According to an embodiment of the invention, the module includes: a doctrinal rule validation and analysis unit to select a doctrinal template based upon the stories entered into the end user collaboration units and to use the selected doctrinal template to combine the stories in the story matrix.

According to an embodiment of the invention, the module includes a constraint detection agent unit which detects external constraints relative to one or more variables of the problem and provides an alert through the end user collaboration units where there is a conflict between the one variable and the external constraints.

According to an embodiment of the invention, the module includes a data assumption monitoring agent which monitors new information that impacts an assumption of the decision process and alerts the end user collaboration units of the new information.

According to an embodiment of the invention, the at least one automated facilitation server flags elements of the story having discrepancies, guides the end user collaboration units to resolve the discrepancies, and constructs the story matrix when the discrepancies have been resolved by the end user collaboration units.

According to an embodiment of the invention, the module includes an adaptive probability aid agent that assigns initial probabilities to nodes of the influence diagram.

According to an embodiment of the invention, the at least one automated facilitation server detects nodes of the influence diagram, and allows initial probabilities to be altered by the end user collaboration units according to an extent that the probability will occur during resolution of the problem.

According to an embodiment of the invention, the at least one automated facilitation server uses the altered probabilities for the detected nodes of the influence diagram to construct a decision tree for each potential outcome with a degree of probability for that outcome as indicated by the altered probabilities.

According to an embodiment of the invention, the at least one automated facilitation server requires the end user collaboration units to prioritize a relative importance of each node in resolving the problem, and uses the prioritized nodes and the altered probabilities for the detected nodes of the influence diagram to construct a decision tree for each potential outcome with a degree of probability for that outcome as indicated by the altered probabilities and prioritized nodes.

According to an embodiment of the invention, the at least one automated facilitation server constructs a best course of action according to the probabilities and priorities reflected in the decision tree.

According to an embodiment of the invention, the at least one automated facilitation server provides a sensitivity analysis for variables in the story matrix to determine a relative impact of a change in one of the variables on the best course of action according to the probabilities and priorities reflected in the decision tree.

According to an embodiment of the invention, the at least one automated facilitation server determines a time limit for reaching a resolution of the problem, and alerts the end user collaboration of an amount of time remaining to resolve the problem.

According to an embodiment of the invention, the end user collaboration units comprise an internet browser interface, an application program, or combinations thereof connected to the at least one automated facilitator across one or more networks.

According to an embodiment of the invention, the at least one database comprises a persistent data database to store the story matrix and stories and to maintain the story matrix and stories during the decision process, and the at least one automated facilitation server and the end user collaboration units interact with the story matrix and stories by accessing the persistent data database.

According to an embodiment of the invention, at least one of the end user collaboration units includes a dynamic situation assessment module including a decision template to organize the information of the story stored at the at least one database, a story matrix module which displays the story matrix built using an appropriate doctrinal template retrieved by the at least one automated facilitation server from the at least one database according to attributes of the decision template, an influence diagram module which displays the influence diagram generated by the at least one automated facilitation server based on the story matrix and variables jointly determined by the decision making team to help explain why a story unfolds in the way it does by representing causal and value relationships among story variables, a decision tree probability elicitation module which provides probabilities and values regarding the story variables and transmits input probabilities and values regarding the story variables to the at least one automated facilitation server for use in constructing the best solution, and an analysis module which displays the best solution and the sensitivity analysis provided by the at least one automated facilitation server.

According to an embodiment of the invention, the decision template is in a Motives, Barriers, Resources, and, Timing (MBRT) format and/or a Mission, Enemy, Troops, Terrain-Time (METT-T) format.

According to an embodiment of the invention, an automated method for supporting real-time planning decision making by members of a group includes gathering information in the form of stories from each of a plurality of end user collaboration units regarding resolution of a problem; while sharing the gathered information among the group through end user collaboration units, utilizing the at least one server to create a story matrix combining elements of the stories; continuously accepting and incorporating feedback at the at least one server from each of the end user collaboration units regarding probabilities and/or relative importance of selected elements of the story matrix to construct a decision tree connecting all possible outcomes of the elements according to a Modified Petri Net discrete event formalism which the at least one server displays at the end user collaboration units; providing the end user collaboration units with a best resolution of the problem based upon the decision tree and the probabilities and/or relative importance of the selected elements as determined by the at least one server from the input probabilities and/or relative importance; and providing by the at least one server the end user collaboration units with a sensitivity analysis for each of the selected elements to detect an effect of varying the selected elements on the best resolution.

According to an embodiment of the invention, the gathering of information further comprises continuously tracking real-world events and alerting the end user collaboration units of a discrepancy between the real-world events and any of the elements of the stories.

According to an embodiment of the invention, the method further includes performing a continuous analysis of said gathered information to provide alerts to the end user collaboration units regarding problem presentation flaws, conflicts in problem/situation understanding, value conflicts, normative group decision criteria, or combinations thereof.

According to an embodiment of the invention, at least one computer readable medium for implementing the method for supporting real-time planning decision executable by one or more processors.

According to an embodiment of the invention, a system for supporting real-time planning and decision making by members of a group includes an automated facilitator implemented as a computer hardware or software system which guides a planning and decision making process by monitoring and controlling the decision process, enforcing a proper decision methodology by coordinating activities of end-user collaboration units, and providing a best result based upon the coordinated activities; the end-user collaboration units which enable interaction among the group members and with the automated facilitator, elicits and captures corresponding group members story, and interacts with the automated facilitator to revise the captured stories; and a services and data unit which interacts with the end-user collaboration units and the automated facilitator to maintain the stories and other related input data required in the decision making process, and provides intelligent decision services which use artificial intelligence and context aware automated agents to apply decision-independent information to the situation so as to enhance the decision model-based decision tools.

According to an embodiment of the invention, the automated facilitator and services and data units are implemented on one or more servers and databases, the end-user collaboration units are implemented as client applications which connect to the automated facilitator and services and data units over one or more networks, and/or web server applications accessed by group members using a web browser over one or more networks.

According to an embodiment of the invention, the automated facilitator and services and data units comprise a story collection unit which elicits and captures individual member assessments of the situation using a pre-determined template; a story matrix module which consolidates the captured individual member assessments and analyzes the result for conflicts in member stories; a feedback unit which, based on the kinds of conflicts noted by the story matrix model, prompts the group members to reconsider or defend their initial assessments further using the story collection unit; a synthesis unit which forms an aggregate decision model and calculates a resulting decision; a workflow unit which considers time requirements and quality of the resulting decision and which decides if further feedback/synthesis is necessary; and a result unit which presents the current best result to the group leader to either be accepted or to have the time constraints adjusted so that the decision may be considered further.**

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
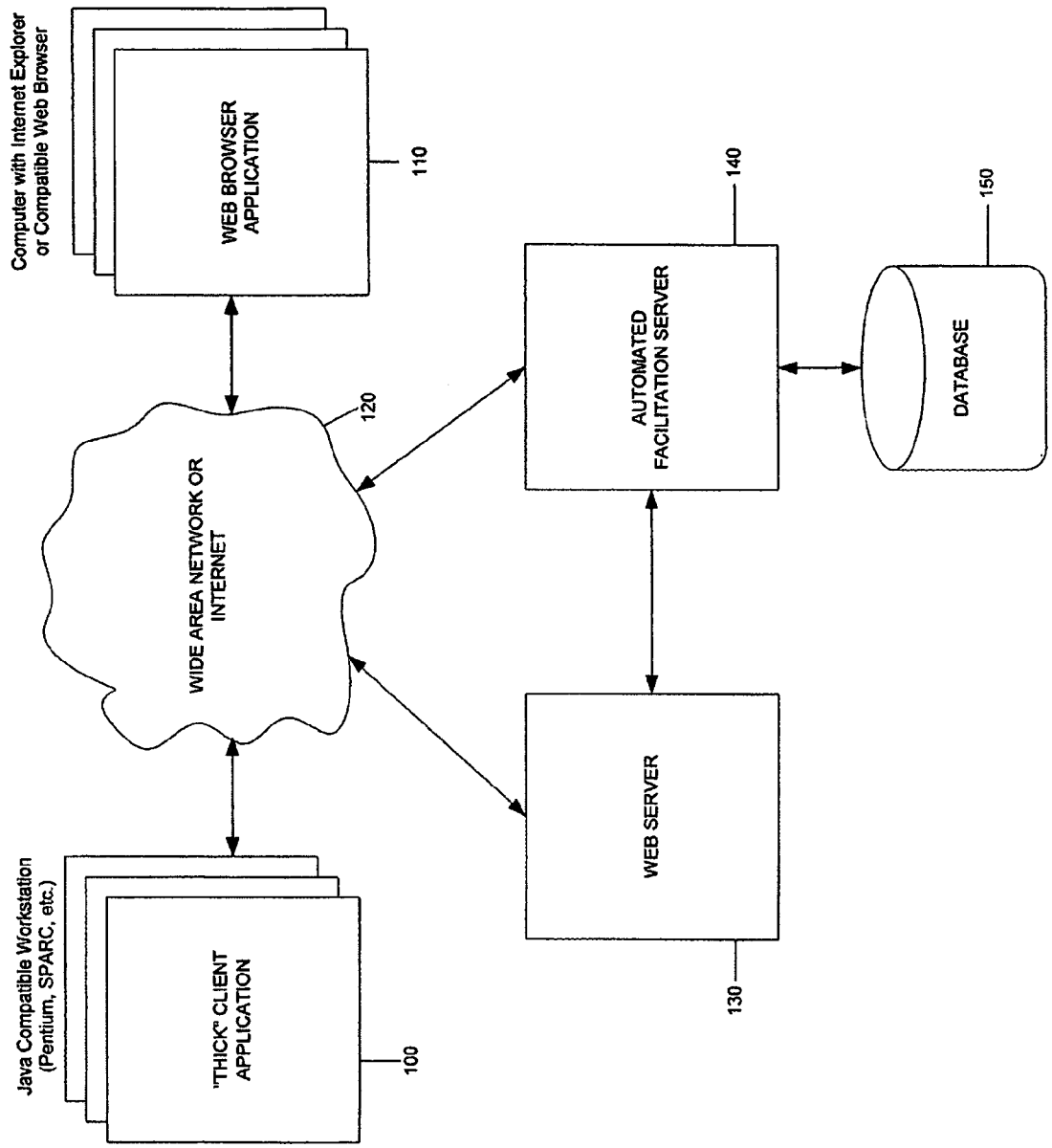
FIG. 1 shows an example of a network topology of the system between plural group members on clients of different types according to an aspect of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An aspect of the invention provides a comprehensive system for supporting real-time planning and decision-making that is easy to use by collaborative groups without the help of an expert facilitator. Decision making includes tactical and non-tactical decision making. Tactical decision making refers to dynamic action selection in order to carry out specific objectives, and is characterized by short time horizons—a few hours to a few days. Tactical decision making can be thought of as an information feedback system, where the moment-by-moment state of events in the real world leads to a decision that results in action which in turn affects the immediate environment and thereby dynamically influences subsequent tactical decisions. Of particular concern is collaborative decision making across agencies and organizations, and in operations involving partners dispersed in different geographical locations. Such decision making is at the center of today's commercial as well as military operations.

While conventional computer systems provide a logical approach to collaborative decision support, no conventional system has provided a fully satisfactory, self-contained, computer support solution. As such, an aspect of the invention provides a novel solution by combining a rigorous, model-based decision analytical focus, which has previously proved successful, with the latest methodology in cognitive decision aiding—including influence diagrams, mental models and critical thinking concepts. Research (such as that performed in Catalyze Ltd. (2004), *Decision Conferencing*, Lam, S. K., "*The Effects of Group Decision Support Systems and Task Structures on Group Communication and Decision Quality,*" *Journal of Management Information Systems*, Vol. 13 No. 4, pp. 193-215 (Spring 1997), and Wheatley, W. A. and Kimbal, L., "*When You Really Must Have Them: Face-to-Face Meetings Using Keypad Electronic Meeting Systems*", in Coleman, D. (Ed.), Groupware, Prentice Hall, N.J. (1997)) shows that structuring group decision making around normative decision analysis models promotes a shared understanding of the issues, facilitates focused discussions on the critical factors and improves both decision quality and speed.

An aspect of the invention uniquely merges findings in cognitive research on naturalistic (real-world) decision making with formally rigorous normative decision modeling and analysis. According to an aspect of the invention, the system enables multiple decision makers to exchange their ideas about a decision problem in the natural form of "stories," and supports a critical thinking dialogue in which the stories are critiqued, improved, comparatively evaluated, and flagged where events and actions may go wrong or afford new opportunities. The system generates multiple, inter-translatable representations of the decision problem. In particular, the system transforms stories into easily interpretable but formally precise influence diagrams and decision trees, and uses the latter to map quantitative evaluations and alerts back onto the original stories.

In an aspect of the invention, the system solves an expert facilitator problem by providing an automatic facilitator capability that can structure the group decision process by expanding established artificial intelligence (AI)-based concepts and experimentally-proven methodologies for autonomous facilitation. Examples of these concepts are found in Ho, T and Antunes, P, "*Developing a Tool to Assist Electronic Facilitation of Decision-Making Groups*" Department of Informatic Engineering, IST, Technical University of Lisboa, Av. Rovisco Pais, 1049-001 Lisboa, Portugal (2002); Lopez, A. V., Queen, B., Natallya S., Shkarayeva, R. O., Briggs, J. F. and Nunamaker, J. F. "*Embedding Facilitation in Group Support Systems to Manage Distributed Group Behavior*" Proceedings of the 35th Hawaii International Conference on System Sciences (2002); and Wong, Z. and Aiken, M., "*Automated Facilitation Of Electronic Meetings*" Information and Management Vol 4-2, (December 2003).

According to an aspect of the invention, Petri Net discrete event formalism is used and allows a common representational structure for the decision process at all levels. Reuse of previous Petri Net technology for manufacturing (see Freedy, A., Chu, Y. Y., and Zev, J. (1995), "*Computer Aided Concurrent Engineering* (CACE): *A modified Petri Net Approach to Process Modeling and Control,*" Final Report, DARPA Contract MO46/03-92-C-0129, Perceptronics, Inc), C2 decision making (see Tabak, D. and Lewis, A. H. (1984), "*Petri-Net Representation of Decision Models,* Technical Report, ONR Contract N0014-83-K-0185, Laboratory for Information and Decision Systems, MIT) as well as of recent applications to dynamic workflow control (see van der Aalst, W. M. P. and ter Hofstede, A. H. M. (2002), "*Workflow Patterns: On the Expressive Power of (Petri-net-based) Workflow Languages*") make this aspect practical as well as innovative. However, it is understood that other types of formalism can be used.

FIG. 1 shows a network topology for a deployed system according to an aspect of the system. Users of the system interact with one of two front-ends: a Client Application 100 which is a Java based application, and/or through a web browser 110. The Client Application 100 is a Java based application and is implemented using a general purpose computer, such as an Intel Pentium P4 or later, AMD K8 or later, PowerPC, SPARC, or other such processor running an operating system, such as Windows XP or later version, Linux, Solaris, MacOS, etc. The Java based application is implemented using a Java Runtime Environment 5.0 or later. However, it is understood that other types of operating systems, applications types, and computers can be used or developed. Moreover, it is understood that other types of devices can be used which allow interaction across a network, such as personal digital assistants (PDAs), smartphones, notebook computers, etc. such that the system is platform independent at least on the client side.

The web browser 110 is implemented on a client interface used on other types of devices. Examples of such browsers include Microsoft Internet Explorer or Mozilla Firefox or other like interfaces. Since the system accommodates multiple team member users and a team leader, the system can interact with multiple Client Applications 100 and/or web browsers 110 at the same time. As shown in FIG. 1, Client Applications 100 are used at the same time that multiple web browsers 110 are used. However, it is understood that both front-end types need not be used in all implementations of the invention.

The Client Applications 100 and web browsers 110 interact with a backend of the system across a network 120. While not required, it is understood that one of the users can interact with the backend directly using a resident copy of the client application 100 and/or web browser 110, such as when the team leader is collocated with the backend. Thus, each of the users does not necessarily interact with the backend across the network 120 in all aspects. As shown, the network 120 is a wide area network and/or the internet. All shown network communication are secured using standard asymmetric encryption techniques (VPN, SLY, PKI) when required. However, it is understood that other types of networks, both public and private types of networks as well as wireless networks, can be used in order to connect team member users in the field with each other and with the backend of the system such that the team members need not be collocated with each other and with the backend of the system. Further, other types of encryption can be used and/or, if security is not required within the network 120, no encryption need be provided.

The backend of the system include an Automated Facilitation Server 140. A Web Server 130 is used for interaction with the browser based front-end (i.e., web browsers 110). While shown as separate, it is understood that the servers 130 and 140 can be combined on a single unit, or spread among more than two units as needed. Further, if no browser based front end is used, the server 130 need not be used. The Automated Facilitation Server 140 interacts with a database 150, which stores models and other background data for use in implementing the system as will be described in detail below.

While not required in all aspects, the servers 130 and 140 are implanted using commercial processors, such as Intel Pentium P4 or later, AMD K8 or later, PowerPC, SPARC, type etc, running commercial operating systems, such as Windows Server Edition (NT, 2000, 2003), Linux, Solaris, etc. The Web Server 130 can be run using Apache, Microsoft Internet Information Service (IIS) or equivalent. The Application Server can be run with J2EE Application Server (JBoss, WebLogic or equivalent). The Database 150 can be run with MySQL, Oracle, SQL Server, or equivalent Relational Database Management Systems (RDBMS).

Figure 2:
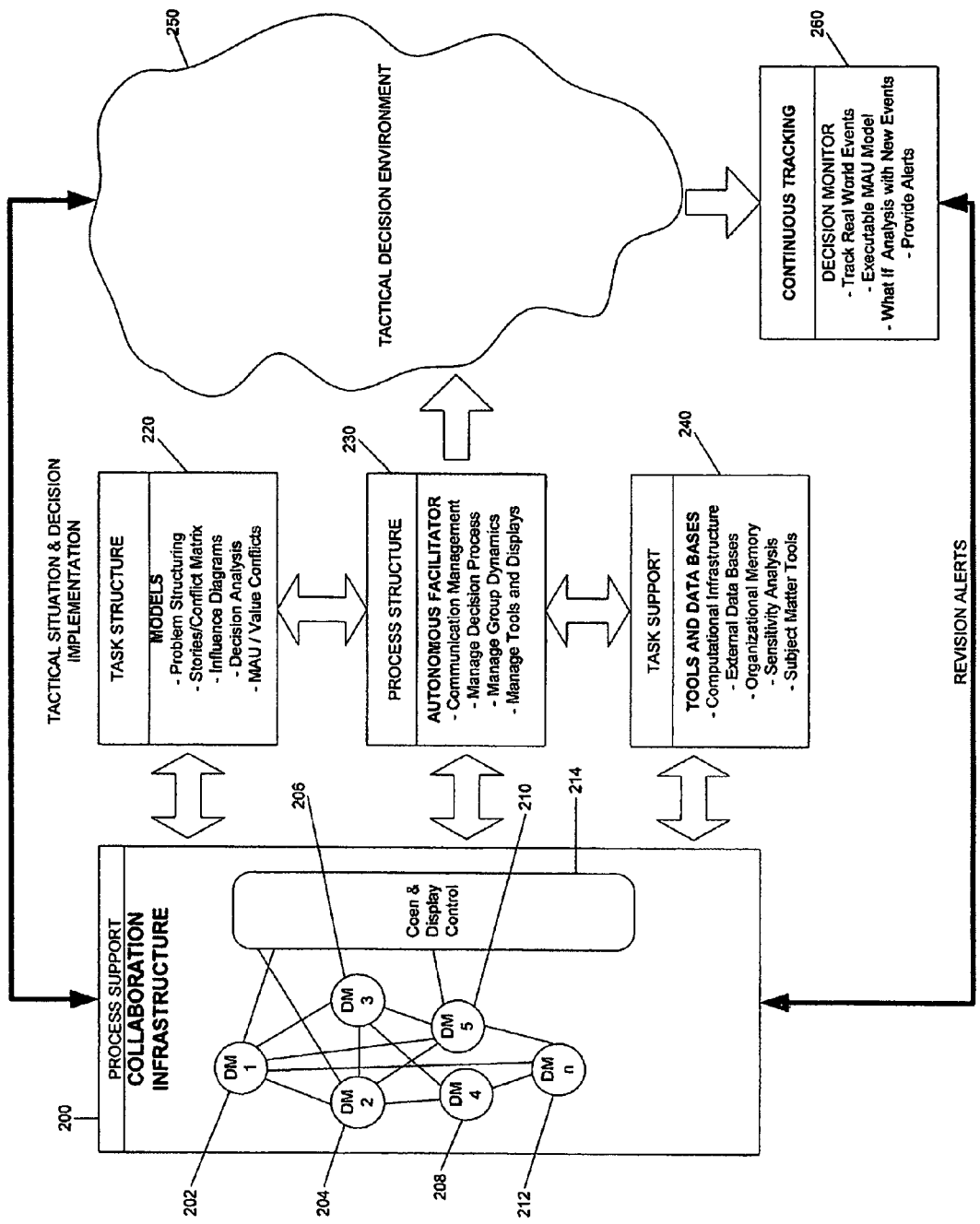
FIG. 2 shows a schematic overview of the system according to an aspect of the invention.

A hardware and software independent implementation of the system is shown generically in FIG. 2 according to an aspect of the invention. The system is structured around the four mechanisms which are required to support group decision making: process support structure 200; task structure 220; process structure 230; and the task support structure 240. While not required in all aspects, a fifth mechanism is included: continuous post-decision tracking structure 260.

In the process support structure 200, a collaborative infrastructure is created in order to allow interaction between the users (i.e., between the team leader and/or team members). In this way, plural decision models (DMs) 202, 204, 206, 208, 210, 212 are created and revised based upon input from other team members and/or the team leader based upon guidance received from the task structure 220, the process structure 230, and the task support structure 240 received through a DM communication and display control 214. Also input are revision alerts received from the continuous tracking structure 260 as well as tactical situation and decision implementation updates received from a tactical decision environment 250.

The task structure 220 includes multiple models. The models include models for problem structuring, a stories and conflict matrix, influence diagrams, decisions analysis, and multi-attribute utility (MAU) model value conflicts. The task structure 220 interacts with the process support structure 200 and the process structure 230. The process structure 230 includes an automatic facilitator, which performs communication management, decision process management, group dynamics management, and tools and display management. The process structure 230 interacts with the process support structure 200, the tactical decision environment 250 and the task support structure 240. The task support structure 240 includes tools and databases including computational infrastructure, external databases, organizational memory, sensitivity analysis, and subject matter tools.

When used, the continuous tracking structure 260 has a decision monitor which extracts information from the tactical decision environment 250 to track real world events, execute a MAU model, perform a "what if" analysis with new events, and provide alerts.

As shown, the system is interactive, allowing the decision models 202, 204, 206, 208, 210, 212 to be affected by the task structure 220, the process structure 230, the task support structure 240 as well as using information received from the continuous tracking structure 250 and/or the tactical decision environment 250 directly. In the shown embodiment, the system is a facilitator-free group decision support system embedded in a collaboration framework using a scaleable and modular multi-tier architecture. The system features innovative built-in elements for accessing, integrating and analyzing information, including: a scaleable and modularly configurable Web-centric information sharing infrastructure which supports real-time group collaboration with a variety of media; a human-factored graphical interface which makes complex cognitively-based decision support tools available to tactical users in an easy-to-understand operational context; and software agents and visualization tools that assist in accessing information, making inferences and determining new information gathering and fusion requirements.

Figure 3:
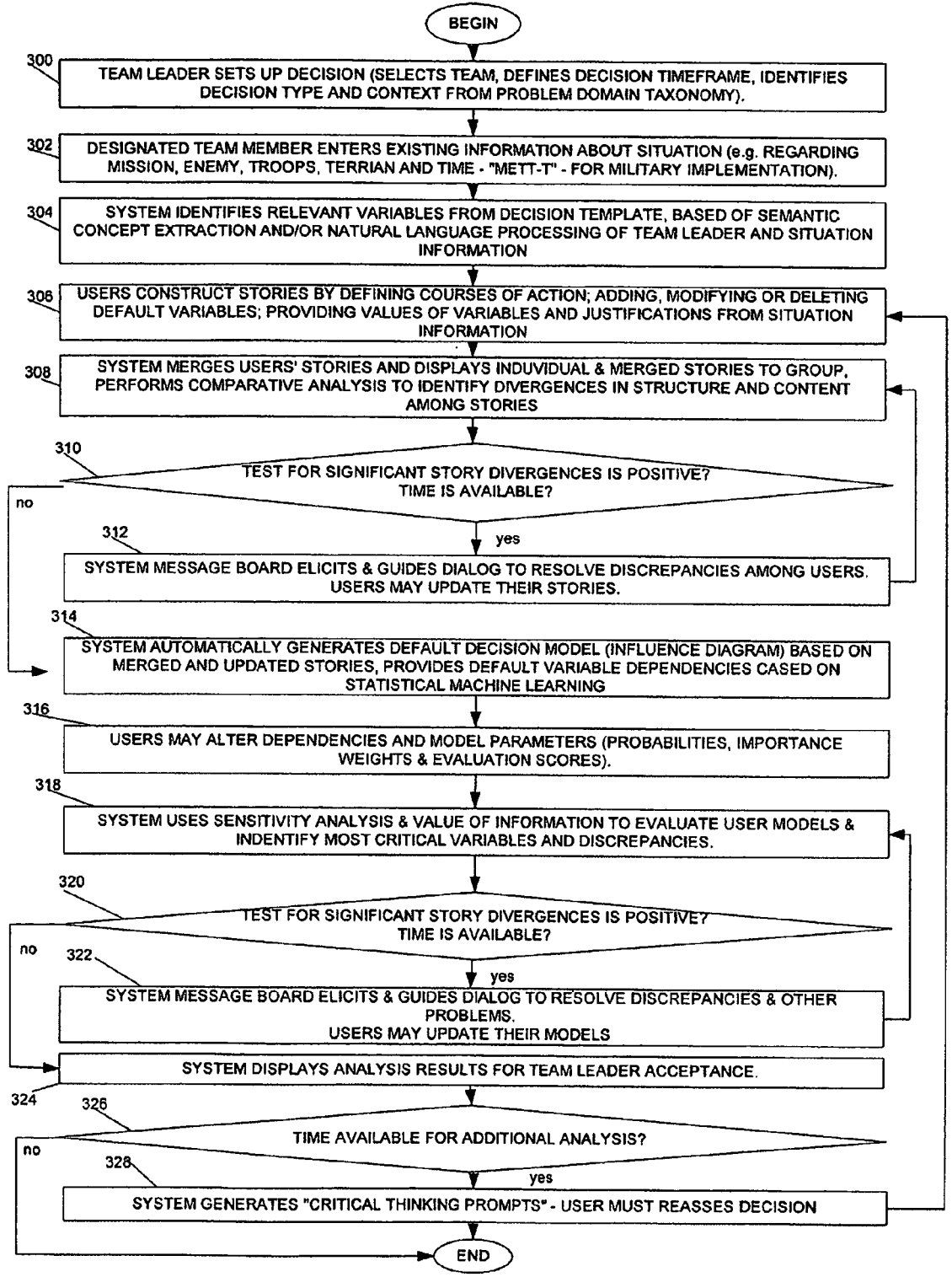
FIG. 3 shows a flowchart of the method according to an aspect of the invention.

FIG. 3 shows a top level flowchart of the process implemented by the system shown in FIGS. 1 and 2 according to an aspect of the invention. In operation 300, the team leader sets of the decision point (DP) to be decided by the team. The team leader defines the parameters of the problem to be resolved and the team members to resolve the problem. Specifically, the team leader selects the team, defines the decision timeframe, identifies the decision type, and the context from the problem domain taxonomy. It is understood that certain of these items can be decided in advance (such as the time to resolve, the team members to use in particular types of decisions, etc.), and that others of the elements need not be selected, such as whether there is no timeframe due date to resolve the problem.

In operation 302, each designated team member enters existing information about a situation related to the decision. The existing information can be input into the system, such as by text or by dragging and dropping text into a template or through other mechanisms such as voice commands or selecting pull down lists of options. According to an aspect of the invention, the team member user enters this data using a standard decision template. By way of example, in the context of a military decision, the decision template can use a standard Mission, Enemy, Troops, Terrain, and Time (METT-T) decision template whereby each team member inputs data corresponding to each of the METT-T categories as shown FIG. 7. However, it is understood that other parameters would be used in addition to or instead of the METT-T format as appropriate in other applications of the invention.

In operation 304, the system extracts and identifies the relevant variables from the input data of each team member user. In order to identify the variables, the system utilizes semantic concept extraction and/or natural language processing of the team leader and the situation information. In operation 306, the team members construct stories by defining courses of action (COAs). The team members further add, modify, and/or delete default variables; and/or provide values of variables and justifications from situation information.

Figure 8:
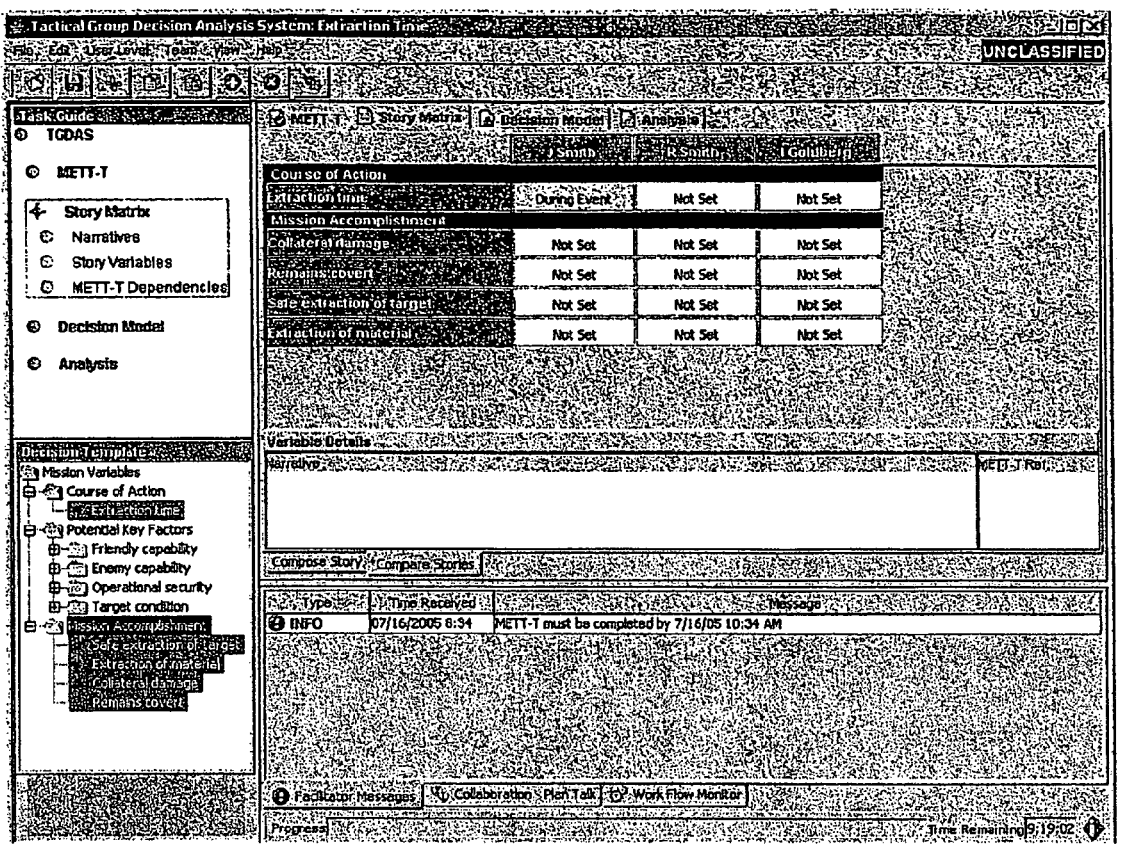
FIG. 8 is an example of a Team Story Matrix Screen according to an aspect of the invention.

In operation 308, the system merges the stories generated by the team members and displays the individual and merged stories to the team members. The system further performs comparative analysis to identify divergences in structure and content among the various stories. Examples of the mergers are shown in FIG. 8 and the divergence detection is found in Table 1 and FIG. 5. In operation 310, the system tests whether the identified divergences are significant and whether the set time to resolve the problem allows for additional analysis. If there are significant divergences and there is time to resolve, the system uses a system message board accessible to the team members and/or the team leader in order to resolve the more significant divergences in the stories in operation 312. Specifically, the system elicits responses and guides dialog on the system message board to resolve the significant discrepancies in the stories, and allows the team members and/or the team leader to update their stories input in operation 306 as needed.

After operation 312 or where operation 310 indicates no significant divergences and/or that not enough time is available, the system generates a default decision model in operation 314. By way of example, the default decision model can be DM 1 202 shown in FIG. 2. According to an aspect of the invention, the default decision model is an influence diagram based upon the merged and/or updated stories and provides default variable dependencies based upon statistical machine learning. An example of the decision model is the influence diagram shown in FIG. 9.

Figure 10:
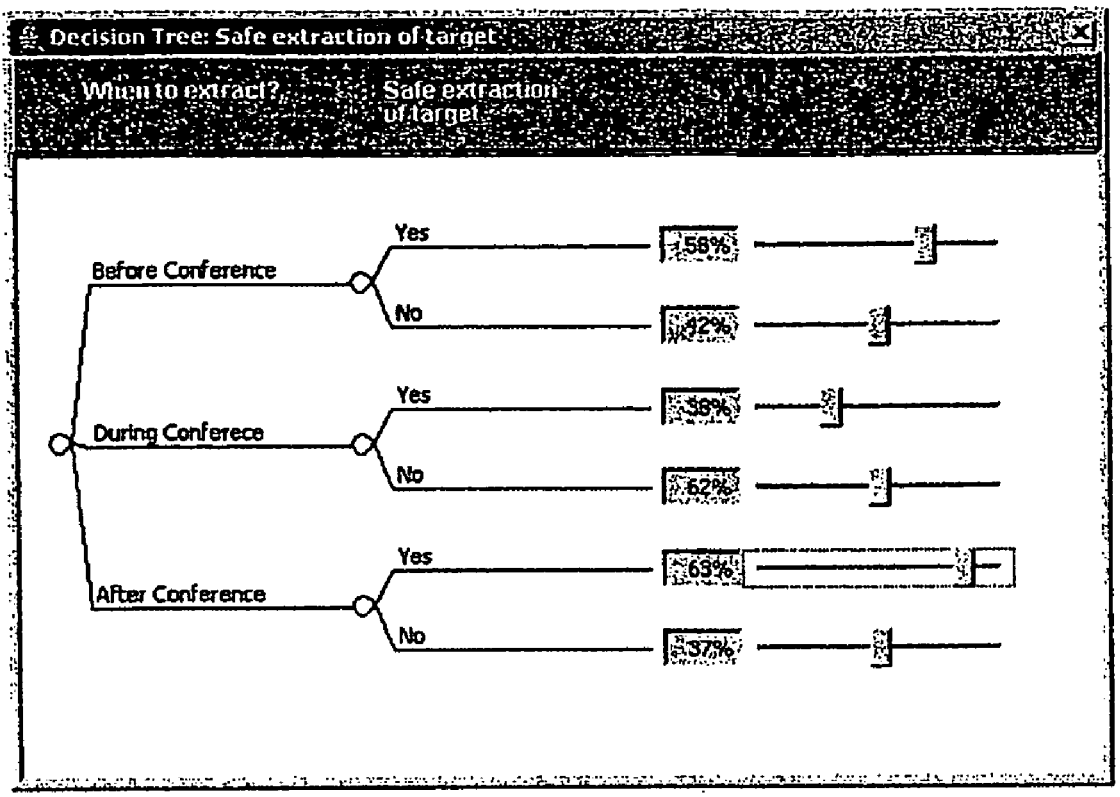
FIG. 10 is an example of a Probability Window in which probabilities are adjusted in the Influence Diagram of FIG. 9 according to an aspect of the invention.
Figure 11:
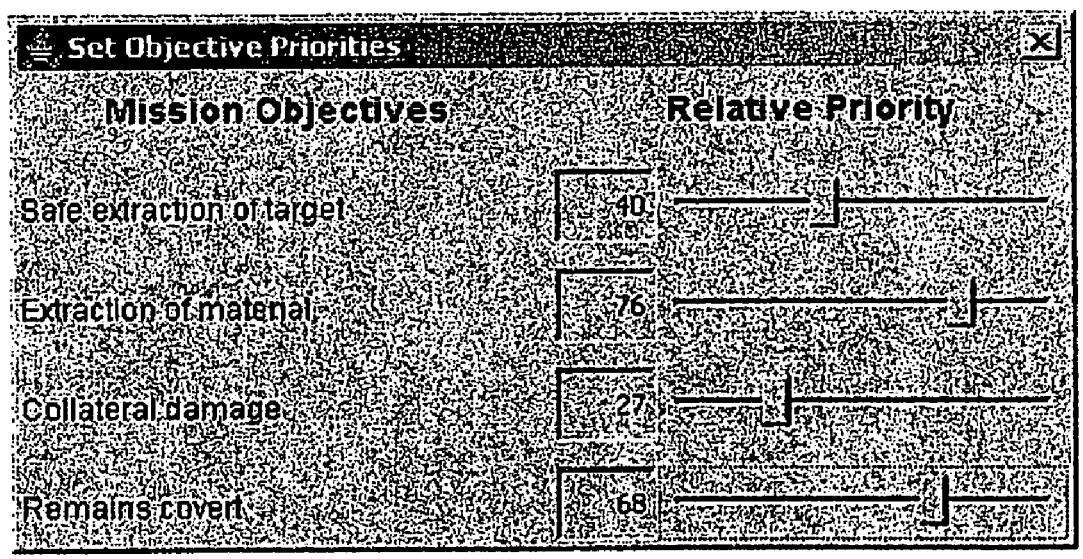
FIG. 11 is an example of a Relative Priority Window in which values are adjusted in the Influence Diagram of FIG. 9 according to an aspect of the invention.

In operation 316, the team members and/or the team leader alter dependencies and/or model parameters to evaluate different decision models (e.g., DM 1 through DM n 202, 204, 206, 208, 210, 212 of FIG. 2). Specifically, the system allows the team members and/or the team leader to change probabilities, importance weights, and evaluation scores. Examples of how such changes can be made graphically are shown in FIGS. 10 and 11.

In operation 318, the system uses sensitivity analysis and value of information to evaluate the different decision models generated in operation 316 and identifies the more critical values and discrepancies between the different decision models. In operation 320, the system tests for significant model discrepancies and whether there is time available to resolve the discrepancies. If there are significant divergences and there is time to resolve, the system uses a system message board accessible to the team member users and the team leader in order to resolve the more significant divergences in the models in operation 322. Specifically, the system elicits responses and guides dialog on the system message board to resolve the significant discrepancies in the models, and allows the team members and/or the team leader to update their decision models input in operation 316 as needed. An example of this analysis is shown in FIGS. 13 through 16.

After operation 322 or where operation 320 indicates no significant divergences and/or that not enough time is available, the system displays analysis results which the team leader can accept. The system determines in operation 326 whether there is additional time for analysis. If there is additional time, the system generates critical thinking prompts and allows users to reassess their decision model in operation 328. After operation 328 or where operation 326 indicates that there is insufficient time for additional analysis, the system process ends. The system prompts for critical thinking by asking the stake holders basic questions to challenge their underlying assumptions. The questions will be context specific based on the decision template. Alternatively, the system may use an approach called the "crystal ball method" by which the Automated Facilitator indicates the using a "crystal ball" it can forecast that the selected decision course of action is wrong and asks the users to determine why. This forces the users to analyze additional factors they may not have initially considered.

Figure 4:
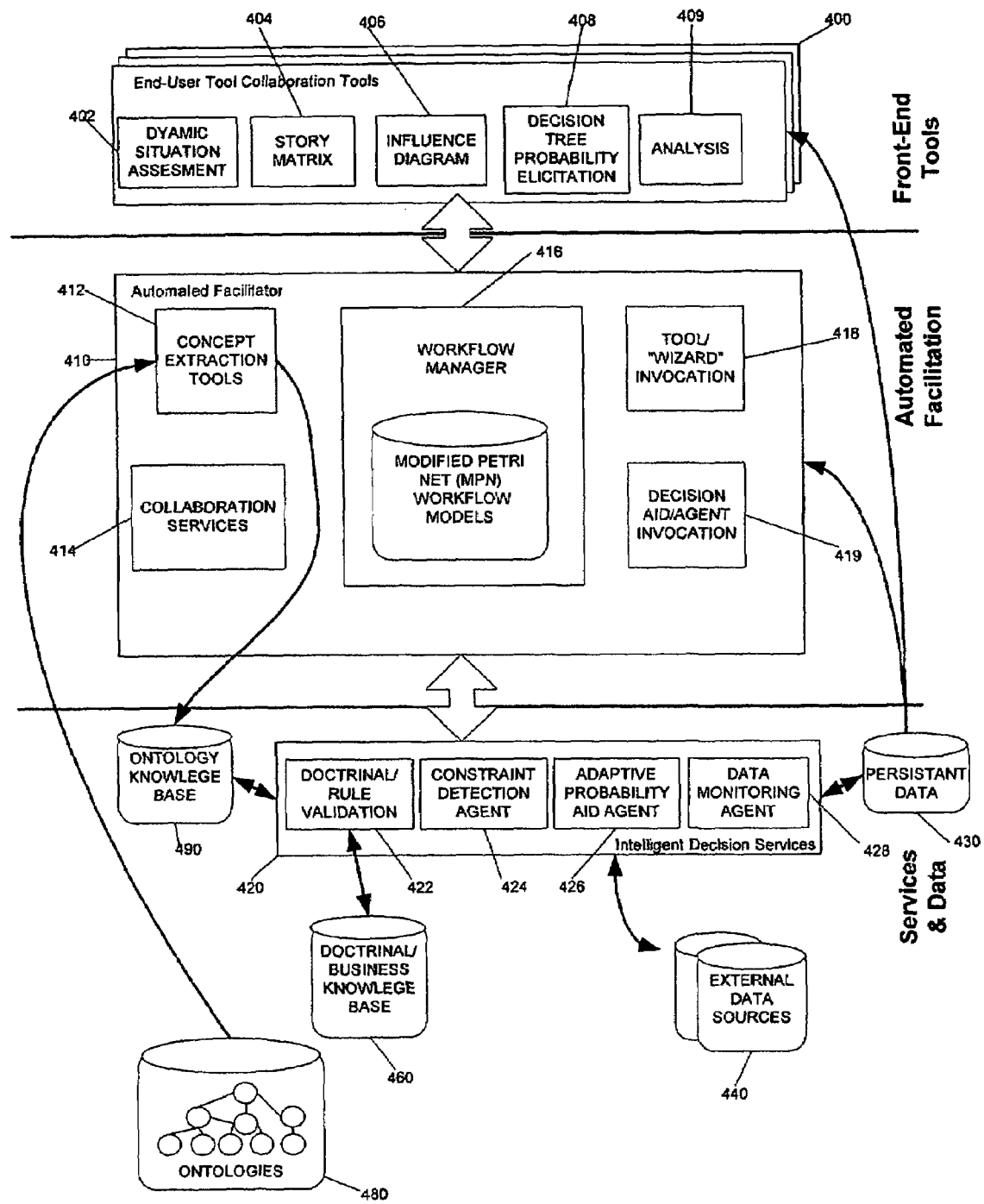
FIG. 4 shows a schematic overview of the system architecture and data flows according to an aspect of the invention.

In order to understand the data flow according to an aspect of the invention, FIG. 4 shows the high level TGDAS architecture implementing the process of FIG. 3 in terms of data flows. The architecture is divided into three structural and functional tiers: End-User Tools/Collaboration Tools 400, Automated Facilitation 410, and Services 420 and Data 430-490. The End-User Tools/Collaboration Tools 400, Automated Facilitation 410, and Services and Data (i.e., Intelligent Decision Services 420 and databases 430-490) interact with each other as described separately below.

The End-User Tools/Collaboration Tools 400 includes a dynamic situation assessment module 402, a story matrix module 404, an influence diagram module 406, a decision tree probability elicitation module 408, and an analysis module 409. As shown, the End-User Tools/Collaboration Tools 400 is provided for each team member and/or the team leader, such as through the use of the work station having the client application 100 or the browser application 110 of FIG. 1. The End-User Tools/Collaboration Tools 400 interacts with the Automated Facilitation 410 in order to revise the stories and/or decision models of the different team member users and/or the team leader. Moreover, while not required in all aspects of the invention, the End-User Tools/Collaboration Tools 400 interacts with other programs, such as project planning software programs, for use in resolving decision points detected during the planning process.

By way of example, the End-User Tools/Collaboration Tools 400 can be integrated with the U.S. SOCOM (Special Operations Command) SOFTools software suite for operational planning. The application could use the specific military METT-T format (Mission, Enemy, Troops, Terrain-Time) in the decision template for dynamic situation assessment module 402 to organize the information on which the decision is based. By way of the Example shown in FIG. 7, a test case involving a SOCOM scenario in which a foreign scientist (asset) is to be voluntarily removed (extracted) from his unfriendly home country along with some of his critical scientific documents (material). The decision involves the time of extraction—before, during, or after a technological conference that is scheduled in his country. However, it is understood that other decision templates and software suites can be used for other governmental and commercial purposes.

The Automated Facilitator 410 is an intelligent workflow mechanism that drives the decision process. The Automated Facilitator 410 can be implemented using the servers 130, 140 in conjunction with elements of the database 150. While additional functions can be performed, according to the shown embodiment, the Automated Facilitator 410 has the following modules: workflow manager 416, tool/wizard invocation module 418, an intelligent decision aid/agent invocation module 419, concept extraction tools 412, and collaboration services module 414.

The workflow manager 416 maintains and controls the overall state of the decision process and guarantees that the proper decision process and methodology is being adhered to.

The Workflow Manager 416 also prompts the team members and/or the team leader using the End-User Tools/Collaboration Tools 400 for inputs to ensure time constraints are met.

The tool/wizard invocation module 418 guides team member and/or the team leader through the use of tools by invoking wizards to help extract the necessary information for a given step in the process. The intelligent decision aid/agent invocation module 419 invokes the intelligent decision aids to assist in the process or to gather information from external data sources (such as from the external data sources database 440) which may influence the decision process. The collaboration services 414 performs collaboration management and prompts the users (i.e., the team members and/or the team leader) to use collaboration capabilities to resolve conflicts. Examples are shown in Table 1 and FIG. 5.

The shown Automated Facilitator 410 is controlled by rules encoded in a workflow model or models using Modified Petri Net (MPN) formalism according to an aspect of the invention. The shown MPN models are included in the workflow manager 416. The MPN models provide the following benefits, among others. The MPN models provide rich expressive capability for codifying workflow rules using a directed graph representation of activities (places) and transitions. The MPN models allow workflow to be not hard-coded in the system but to evolve with system use. The MPN models can be constructed and refined by domain experts (decision experts, not programmers). However, it is understood that other models can be used or developed.

The Automated Facilitator 410 also utilizes the Concept Extraction Tools 412 such as Inxight Software's SmartDiscovery to generate semantic mappings from textual data entered by the user to domain an ontology which defines the decision problem space. The tools 412 interact with the ontology knowledge base 490 and the ontologies 480, and from this interaction, a machine understandable knowledge representation is generated and stored in a knowledge base database.

The Services and Data include the Intelligent Decision Services 420 and the databases 430, 440, 460, 480, and 490 and are implemented using the databases 150 and one or more of the servers 130, 140 of FIG. 1. The Intelligent Decision Services 420 are a set of "context aware" agents and artificial intelligent (AI) utilities which enhance the decision model based decision tools with adaptive and semantic analysis capabilities according to an aspect of the invention. The Intelligent Decision Services 420 are facilitated through an ontology based knowledge representation of the problem and decision attributes and which are stored in the Ontology Knowledge base database 480. Thus, the Intelligent Decision Services 420 aids the team members and/or leader to identify constraints so as to eliminate options and/or "prune" the decision tree. As shown, the module Intelligent Decision Services 420 includes a doctrinal rule validation and analysis 422, a constraint detection agent 424, an adaptive probability aid agent 426, and a data (assumption) monitoring agent 428. While not required, it is understood that the Intelligent Decision Services 420 can be otherwise configured, and can include other agents and analysis in other aspects of the invention.

The doctrinal rule or policy validation and analysis module 422 is a module that assesses the doctrinal validity/policy compliance of data entered into a decision template, such as the METT-T at the dynamic situation assessment module 402. Of course, it is understood that other forms of dynamic situation assessment can be used in stead of or in addition to METT-T, such as Motives, Barriers, Resources, and, Timing (MBRT). Based on the decision template attributes, the appropriate doctrinal template can be identified and used to build the story matrix at the story matrix module 404 of the TGDAS End-User Tools/Collaboration Tools 400 for each team member and/or team leader. The doctrinal rule validation and analysis module 422 further interacts with and utilizes the doctrinal/business rule knowledge base database 460 according to the shown embodiment.

The constraint detection agent 424 attempts to access external databases such as the external data sources databases 440 to determine whether constraints (such as resource requirements) modeled in the influence diagram 406 can be satisfied. For example, if a particular action requires 10 Blackhawk helicopters, but according to the METT-T summary only 5 are currently deployed in the Theater of Operation, the constraint detection agent 424 will alert the team member users and/or leader. In a commercial equivalent, for example, if a particular action requires 10 trucks, but according to the decision template summary only 5 are currently available or where traffic renders a particular route untenable, the Constraint Detection Agent 424 will alert the team members and/or leader.

The adaptive probability aid agent 426 uses machine learning capabilities to assist in assigning default probabilities to a decision tree being constructed using the decision tree probability elicitation module 408. The data (assumption) monitoring agent 428 monitors for new information that impacts key assumption in the decision and alerts the team member users and/or leader of changes.

A decision model persistent data database 430 interacts with the Intelligent Decision Services 420, the Automated Facilitator 410, and each of the End-User Tools/Collaboration Tools 400 in order to maintain the stories and related input data required during the decision making process. All decision model data is serialized for storage and retrieval from the decision model persistent data database.

The following phases summarize the functions of the Automated Facilitator 410 in the context of phases of the decision making process. While it is understood that other phases and rules may be used, the following description is intended also to exemplify rules which may be encoded in the MPN formalism to drive the workflow according to Phases I through V.

In Phase I, the Automated Facilitator 410 collects basic information from the team leader to initiate the process. By way of example, the Automated Facilitator 410 collects the names of the team members and some form of contact information (such as e-mail addresses or user names associated with phone text and/or instant messaging), if not already in the system. The Automated Facilitator 410 collects information on the preliminary time target for reporting on the best option (e.g. 1 day, 2 days, etc.) to the extent applicable. The Automated Facilitator 410 generates a system-suggested time schedule to meet the time target, based on previous experience with the system and the size of the group (e.g., 3 hours on information acquisition, 2 hours on ID, etc.) This schedule may or may not be disseminated to the team members. Optionally, the Automated Facilitator 410 customizes (if necessary) and disseminates to the team members a brief previously-prepared tutorial on the decision making process, including its goals and expectations, its procedures, and the methods for accessing generally available information as well as communicating among participants. The Automated Facilitator 410 schedules and assigns the first task of identifying relevant decision template factors, such as the METT-T.

Based upon the time target, the Automated Facilitator 410 sets milestones (subject to modification by the team leader) for each phase, based upon prior experience (in a database) including size of group, complexity of the task, time to final decision, etc.

In Phase II, each team member enter completes the developed template, such as a METT-T form, and/or enters narrative "story" using the dynamic situation assessment module 402 corresponding to the team member user. The Automated Facilitator 410 monitors the time taken during Phase II. The Automated Facilitator 410 posts a "countdown" clock on each user screen for final decision and end of each milestone. An example of such a posted countdown clock is shown in FIGS. 7-9, 13, 15, and 17.

While not required in all aspects, a meter can be provided in order to spur decisions. As such, individual team members can use the meter (or other entry method) on their computer 100 or browser 110 to indicate their willingness to move on, thereby providing a polling mechanism to ensure movement in the decision process. When a certain threshold is reached (e.g. 80% of the group have indicated a 70% willingness to end Phase II), the Automated Facilitator 410 will stop the session. By way of example, the Automated Facilitator 410 can send a warning message such as: "The current phase will end in 2 minutes. Please finish your narrative now." Then, the Automated Facilitator 410 terminates phase II and moves on to Phase III.

Figure 5:
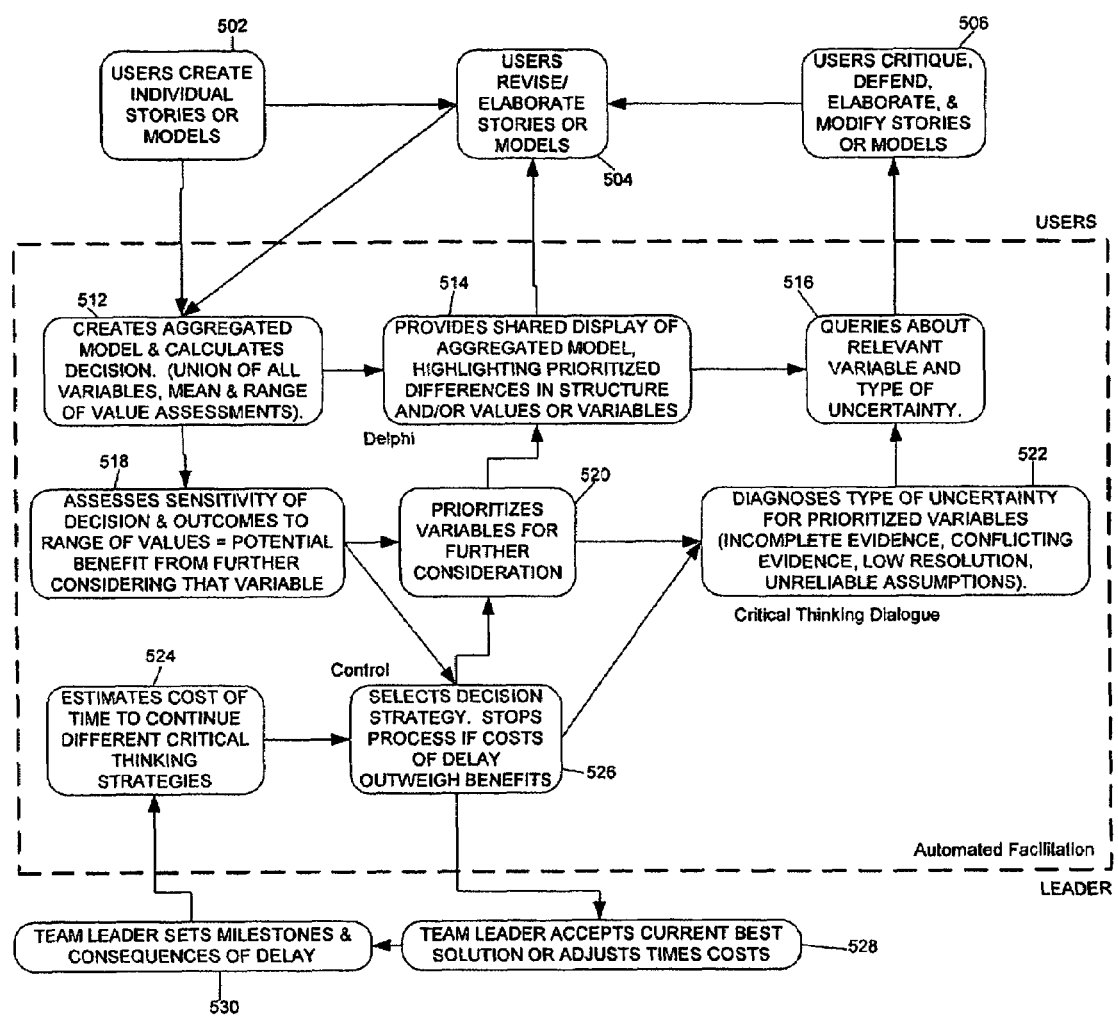
FIG. 5 shows a conflict detection and resolution schematic overview implemented by the system of FIG. 2 according to an aspect of the invention.

In Phase III, the Automated Facilitator 410 automatically consolidates individual narratives to build a story matrix to be displayed using the story matrix module 404. The Automated Facilitator 410 flags areas of the story matrix which may reflect conflicts in the team members' stories. An example of the process is shown in FIG. 5. Table 1 is an example of a table of Conflict States and Actions used in FIG. 5.

TABLE 1

Table of Conflict States and Action

| Apply to: | Story Variable Set | Variable Value(s) for Common Variable(s) | Facilitator: Possible Diagnoses | Basic Facilitator Action(s) each time stories are merged | Added Facilitator Action(s) to support critical thinking -- guided by value of information/ sensitivity analysis, and time/ accuracy tradeoff |
|---|---|---|---|---|---|
| Individual stories favoring same course of action (COA) | Same | Same | No obvious problems | No flags on merged story. If there are multiple COA's across individuals or if goal is to create a single robust COA, use crystal ball method (1) *. If there is only one COA across individuals & goal is to select top COA(s), use crystal ball method (2) ** | *Stimulate critical thinking: (1) Crystal ball method to flesh out understanding of a specific COA: "Suppose you knew for sure this option will fail, but not the way it will fail. How could this happen?" When a failure condition is mentioned, ask for another: "That is not how the option fails. Think of another way it could happen." When a new failure condition is mentioned, add new variable with assessment = "no" to the relevant individual story to indicate dependence of story on assumption that this condition will not occur. Check with other individuals supporting same COA if this assumption is relevant to his/her story. For individuals who regard it as relevant, add the variable to their stories, and ask them if they wish to modify the COA in light of these problems. If not relevant for some, apply appropriate rules below. ** (2) "Crystal ball" method to generate additional COA's: "Suppose you knew for sure that you will use a different, and better, course of action than the one you have proposed. What is it?" When a new COA is mentioned, ask for another: "That COA may be quite good, but it is not the one you will use. Think of another." When a new COA is mentioned, acti- |

TABLE 1-continued

Table of Conflict States and Action

| Apply to: | Story Variable Set | Variable Value(s) for Common Variable(s) | Facilitator: Possible Diagnoses | Basic Facilitator Actions) each time stories are merged | Added Facilitator Action(s) to support critical thinking -- guided by value of information/ sensitivity analysis, and time/ accuracy tradeoff |
|---|---|---|---|---|---|
| Individual stories favoring same COA | Different | Same | (1) Gap -- Some individuals are unaware of important factors, or neglect them due to inattention, forgetting, etc. (2) Some individuals have included irrelevant or redundant elements in argument. (3) There is real divergence in implicit beliefs or preferences, not yet modeled. | If a variable is included in some but not all individual stories supporting COA, flag the variable as "Relevance in question". (1) Ask individuals to confirm or disconfirm the inclusion of the variable in their individual stories [and if included, to assess values]. If there is now agreement re inclusion of variable in all individual stories, remove flag on merged story. (2) If there is agreement re exclusion from all individual stories, remove variable from merged story. * | vate window to add new COA variable and appropriate value. * (3) If difference remains, explain that relevance means the value of variable plausibly affects occurrence or desirability of outcomes of COAs. Ask individuals to explain why the variable was included or excluded in their stories. Add to individual stories additional variables whose values are said by the individual to determine relevance or non-relevance. |
| Individual stories favoring same COA | Same | Different | (1) Random error, e.g., due to inattention, forgetting, etc. (2) Existence of more than one case where COA does well. (3) Conflict (genuinely different opinions or information) at subordinate level of argument. | If individuals supporting same COA do not agree on values of a variable, flag the values as "Uncertain" in merged story (1) Ask individuals to confirm or revise the values they assessed. If values of variable are revised so that there is agreement, remove flag & display agreed value in merged story. (2) If divergences remain, ask individuals to judge whether divergent values are "possible" or "extremely unlikely." For divergences that are mutually judged possible, change flag on that variable to "Multiple cases" and create multiple merged stories for this COA, which vary in values assessed for the variable(s) in question. (3) If divergences remain but are judged extremely unlikely" by one or more of the individuals supporting this COA, flag as "Conflict in reasons for same conclusion." * | * Ask users to explain why a given variable value was assigned. Add to individual stories any additional variables that are cited by the individual as reasons for one assessment rather than another. |
| Merged stories supporting different COAs | Same | Same | Conflict in conclusions across merged stories -- (1) Random error, e.g., due to inattention, forgetting, etc. (2) Failure to include variables about whose values there is disagreement (i.e., Conflicting assumptions or divergent evidence). (3) Disagreement about relationships among variables. | In merged story, flag COA variable as "Conflicting Conclusions -- unexplained." (1) Give users opportunity to revise the values they assessed. If disagreement now appears (re variables, values of variables, or link parameters [decision model only]), remove flag. * | * (2) If there is still no disagreement between merged stories for different COAs, ask users to explain why they believe their preferred COA will have better outcomes, and why some outcomes are better than others. Add any additional variables and values to individual stories of individuals who cite them. May use crystal ball method: "Crystal ball says there is a way this option is better than that one. What is it? . . ." (3) Disagreement abut relationships can be discovered and addressed in Decision Model phase. |
| Merged stories supporting different COAs | Different | Same | Conflict in conclusions among merged stories, due to -- (1) Gap: Supporters of one | If a variable is in the merged story for one COA but not another, flag the variable as a "Relevance in Question". | (3) If there is still disagreement re inclusion of variable, ask under what conditions the variable would or would not be rele- |

TABLE 1-continued

Table of Conflict States and Action

| Apply to: | Story Variable Set | Variable Value(s) for Common Variable(s) | Facilitator: Possible Diagnoses | Basic Facilitator Action(s) each time stories are merged | Added Facilitator Action(s) to support critical thinking -- guided by value of information/ sensitivity analysis, and time/ accuracy tradeoff |
|---|---|---|---|---|---|
| | | | COA are unaware of important factors, or neglect them due to inattention, forgetting, etc. (2) Inclusion of irrelevant or redundant elements in argument for a COA. (3) Divergence in implicit beliefs or preferences, not yet modeled. | (1) Ask individuals to confirm or disconfirm the inclusion of the variable in their individual stories [and if included, to assess values]. If there is now agreement re inclusion of variable in all individual stories, remove flag on merged story. (2) If there is agreement re exclusion from all individual stories, remove variable from merged story. | vant. If relevance is turned on and off by values of other variables, add the latter variables to the story and assess values. |
| Merged stories supporting different COAs | Same | Different | Conflict in conclusions among merged stories -- due to assessment of different values for variables. Due to (1) Random error, e.g., due to inattention, forgetting, etc. (2) Existence of multiple cases where variable has different values. (3) Conflict (genuinely different opinions or information). | If variable has different specific values in merged stories for different COAs, flag it to indicate "Possible conflict in views." If variable has values in some merged stories but is flagged as uncertain in others, flag as "Possible Challenged Assumption". (1) Ask individuals to confirm or revise the values of variable are revised so that there is agreement, remove flag & display agreed values in merged stories. For variable with a single specific value in some stories and flagged as uncertain in others, flag as "Challenged Assumption" and *. (2) For variables with divergence of specific values, if they still exist, ask individuals to judge whether divergent values are "possible" or "extremely unlikely." For divergences that are mutually judged possible, change flag on that variable to "Multiple cases" and create multiple merged stories for each COA, which vary in values assessed for the variable(s) in question. (3) If divergences in specific values exist at this point that are judged "extremely unlikely" by partisans of at least one COA, flag "Conflict in views." * | Addressing conflict in views #1 - eliciting reasons for belief or preference. Ask partisans of each COA for reasons in favor of their preferred value of the variable or reasons to doubt divergent values. If partisans of merged story for one COA mention a new variable as a reason, add it to their story and elicit values. If reason to doubt includes uncertainty about a variable that has a specific value in another merged story, flag as "Challenged assumptions." |
| Merged stories supporting different COAs | Different | Different | Conflict in conclusions among merged stories -- due to: (1) Consideration of different variables. OR (2) Assessment of different values for variables | First work on different variables, then different values (see above) | |

As shown in FIG. 5, the process is performed between different elements of the system: the user level, a Tactical Group Decision Analysis System (TGDAS) automated facilitation level, and the leader level. The team members and/or the team leader input individual stories and/or decision models at the user level in operation 502. In operation 504, the team members and/or the team leader revise the stories and/or decision models input in operation 502 based upon feedback received from operation 514 (occurring at the TGDAS automated facilitation level) and operation 506 of the user level. The revised stories and/or decision models created in operation 504 are input into the operation 512 at the TGDAS automated facilitation level. In operation 506, the team members and/or the team leader provide critiques of, defend, elaborate on and/or modify stories and decision models based upon queries received from operation 516 performed at the TGDAS automated facilitation level.

In operation 512, the Automated Facilitator 410 creates an aggregate decision model and calculates the decision from the stories and/or decision models input in operation 502 or 504 within the TGDAS automated facilitation level. This created aggregate decision model and calculated decision is a union of all variables, as well as the mean and range of the value assessments. The created aggregate decision model and calculated decision are used in operations 518 and 514 at the TGDAS automated facilitation level.

In operation 514, the Automated Facilitator 410 provides a shared display of the aggregated decision model and highlights prioritized differences in a structure and/or in values of variables using the results of operation 512 and 520. The result of operation 514 is used by the team members and/or the team leader in operation 504 and by the automated facilitator 410 in operation 516.

In operation 516, the Automated Facilitator 410 provides queries about relevant variables and types of uncertainty using the results of operation 514 and 522. The result of operation 516 is used by the team members and/or the team leader in operation 506.

In operation 518, the Automated Facilitator 410 assesses sensitivities of the calculated decision calculated in operation 512 and determines whether the outcome has a range of values equal to the potential benefit from further consideration of each variable. The result of operation 518 is used by operations 520 and 526.

In operation 520, the Automated Facilitator 410 prioritizes the variables for further consideration. The result of the prioritization is used by operations 514 and 522.

In operation 522, the Automated Facilitator 410 diagnoses the type of uncertainty for the prioritized variables from operation 520 using the result of operation 526. For instance, the diagnosis may be that there is incomplete evidence, conflicting evidence, low resolution, and/or unreliable assumptions. The result of the diagnosis is used by operation 516 in developing the queries.

In operation 524, the Automated Facilitator 410 estimates the cost of time to continue the different critical thinking stages based upon input received from operation 530 performed at the leader level. The result of the estimated cost of time is used in operation 526.

In operation 526, the Automated Facilitator 410 the estimated cost of time from operation 524 is used with the result of operation 518 to select a decision strategy. Where it is determined that the cost of time (i.e., delay) in performing additional analysis outweighs the benefits of additional analysis, the process is stopped within the TGDAS automated facilitation level and the team leader receives the current best result in operation 528 at the leader level. Otherwise, the process continues within the TGDAS automated facilitation level in operation 522.

In operation 528, the team leader at the leader level can accept the current best solution. If the current best solution is not acceptable, the team leader adjusts the time costs to allow for further analysis. If the time costs are adjusted, the team leader in operation 530 sets the milestones with the adjusted time costs and outlines the consequences of the delay, and re-enters the process at operation 524 of the automated facilitation level.

Figure 9:
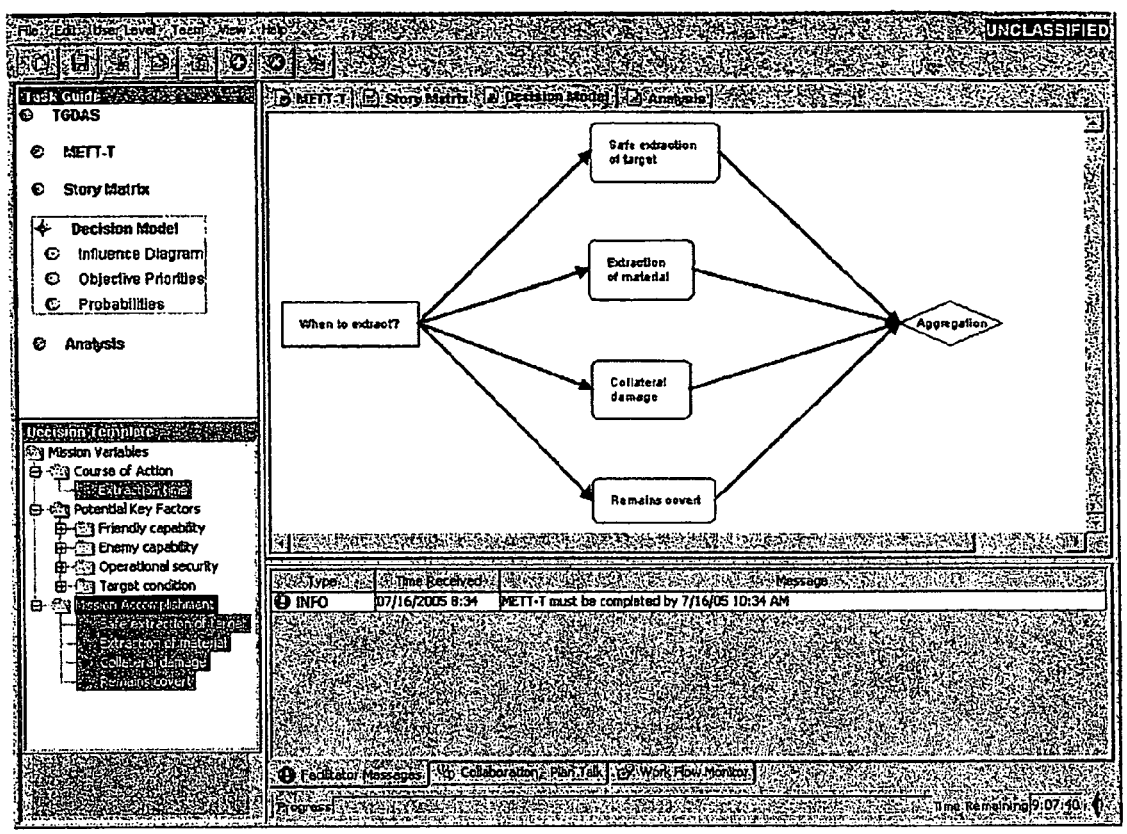
FIG. 9 is an example of an Influence Diagram in which probabilities and values can be adjusted according to an aspect of the invention.

In Phase IV, the Automated Facilitator 410 generates a graphical representation of the story matrix, such as using the influence diagram module 406. The Automated Facilitator 410 includes in the influence diagram nodes representing categories and relevant text available by clicking on the nodes. Individual group members draw influence arrows and assign values. Examples of the influence diagram and assigned values are shown in FIGS. 9 through 11.

Figure 12:
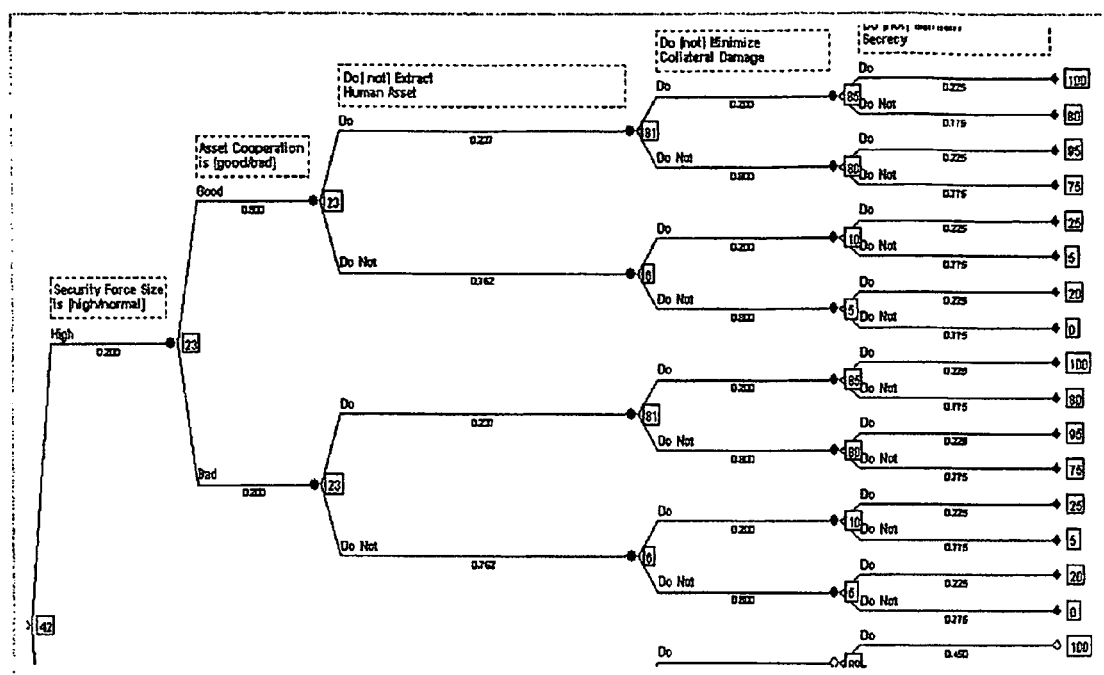
FIG. 12 is an example of a portion of a Decision Tree according to an aspect of the invention.

In Phase V, the Automated Facilitator 410 uses the influence diagram to build a decision tree to which team member users and/or team leader assign probabilities using the decision tree probability elicitation module 408. An example of a portion of the decision tree is shown in FIG. 12. In view of the complexity of the decision tree, the full decision tree need not be displayed to the team members and/or team leader. The Automated Facilitator 410 invokes services for sensitivity analysis and calculates a "best option" course based upon the team members and/or team leader input. Examples of the sensitivity analysis and the best course of action are shown in FIGS. 13 through 16.

According to an aspect of the invention, the team system uses the following heuristic to generate the decision tree:
1. For a given node, the set of nodes upon which the node is dependent as indicated in the influence diagram are determined.
2. All possible combinations of the dependent node outcomes and are considered as paths into the node for which the tree is being generated.
3. A unique tree is generated for each node, with probabilities assigned at the leaf branches.

Figure 6:
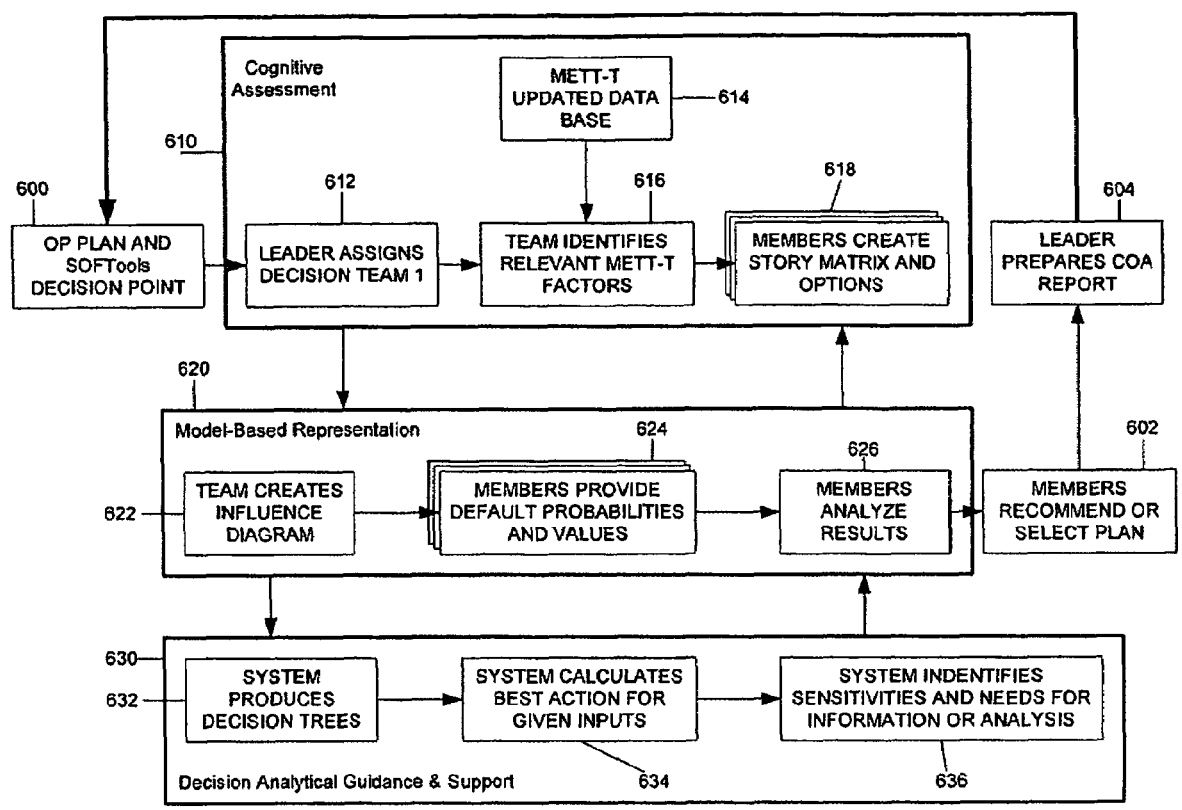
FIG. 6 shows a flow diagram that provides an overview of a Tactical Group Decision Analysis System (TGDAS) decision support process according to an aspect of the invention.

FIG. 6 shows a flow diagram that provides an overview of the decision support process task flow according to an aspect of the invention. For purposes of describing the decision support process task flow for analyzing the results of operation 600, the decision support elements are divided into three major modules corresponding to cognitive assessment actions using a Cognitive Assessment level 610, model representation actions using a Model-Based Representation level 620, and decision analytical guidance and support using a Decision Analytical Guidance and Support level 630. The system having the task flow can be launched from and implemented on the workstations 100, the browsers 110, and/or one of the servers 130, 140 according to aspects of the invention.

In operation 600, the initial input to the system is from a commercial or proprietary software planning package, such as the SOFTools OP Plan or other like planning package. By way of example, an Op Plan is used to establish a Decision Point(s), such as through launching the system from the planning software. The system is evoked when the decision point that requires analysis further analysis is determined. By way of example, the system can be launched by double clicking on a decision point icon in a SOFTools Temporal Plan screen. As such, the initial input contains an identified decision point. However, it is understood that the initial input can be manually or otherwise entered without using such a software planning package, and that the system can be included in or run in addition to the planning software, and/or can be launched without running another software suite.

The cognitive assessment level 610 is initiated within the support process and enables the decision team to formalize its assessment of the decision situation and the options available using an information format which is preferably familiar to the decision team. By way of example, for military planning, the familiar information format can be the military METT-T summary of Mission, Enemy, Terrain, Troops and Time as well as a natural story matrix format derived from cognitive research. However, it is understood that multiple different formats can be developed and can be intuitive so as to allow the decision team to become rapidly familiar with the format. Within the cognitive assessment level 610 are generally included an operation 612, in which the team leader assigns a decision team 1 assigned to a particular decision point 1 to be resolved; an operation 614 in which a METT-T database is updated; an operation 616 in which decision team members identify relevant METT-T factors; and an operation 618 in which each of the decision team members separately enter a corresponding story matrix and options. It is noted that the support system has a task flow which allows multiple Decision Points (i.e., Decision Points 2 through N) to be handled while the Decision Point 1 is being achieved, and allows different decision team leaders to independently create and task corresponding different decision teams 2 through N having corresponding members which may be different or the same.

After being launched, the system generates a Decision Point Properties screen according to an aspect of the invention. The Decision Point Properties screen allows the team members assigned by the team leader to characterize this particular decision point in terms of decision type and decision deadline, to set some look-and-feel parameters for the decision support system, and to append notes and links to the decision point, which can be updated as the decision process continues. Launching from an overarching program provides a familiar contextual setting for the new technology and minimizes training and adoption problems. However, it is understood that the system can be implemented outside of the overarching program.

However launched, in operation 612, the decision team leader assigns the decision team for DP1 (Decision Point 1). According to an aspect of the invention, the system presents the decision team leader with an interface that supports a range of users from novice to expert. While not required in all aspects, the set up screen allows the leader to select the following variables which determine how the will guide the decision team in their decision making process:

1. Mission Type—The tactical situation in which the decision will be made;
2. Decision Type—The kind of decision to be made in the tactical situation; and
3. Workflow Template—The specific process to be followed in TGDAS operation.

In the example case, the Mission is 'Extraction', the Decision Type is 'Time', and the Template is 'Group Merge'. The set up screen also allows the leader to perform the following tasks according to aspects of the invention:

1. Select the decision team members—from among pre-registered, new individuals and/or using pre-set distribution lists of individuals;
2. Set decision deadline—the time by which the decision must be made, which will guide the process; and
3. Comments—add comments that annotate this particular decision.

It is understood that other types of set up screens can be used, and that ones of the input tasks need not be performed in all aspects of the invention.

Figure 7:
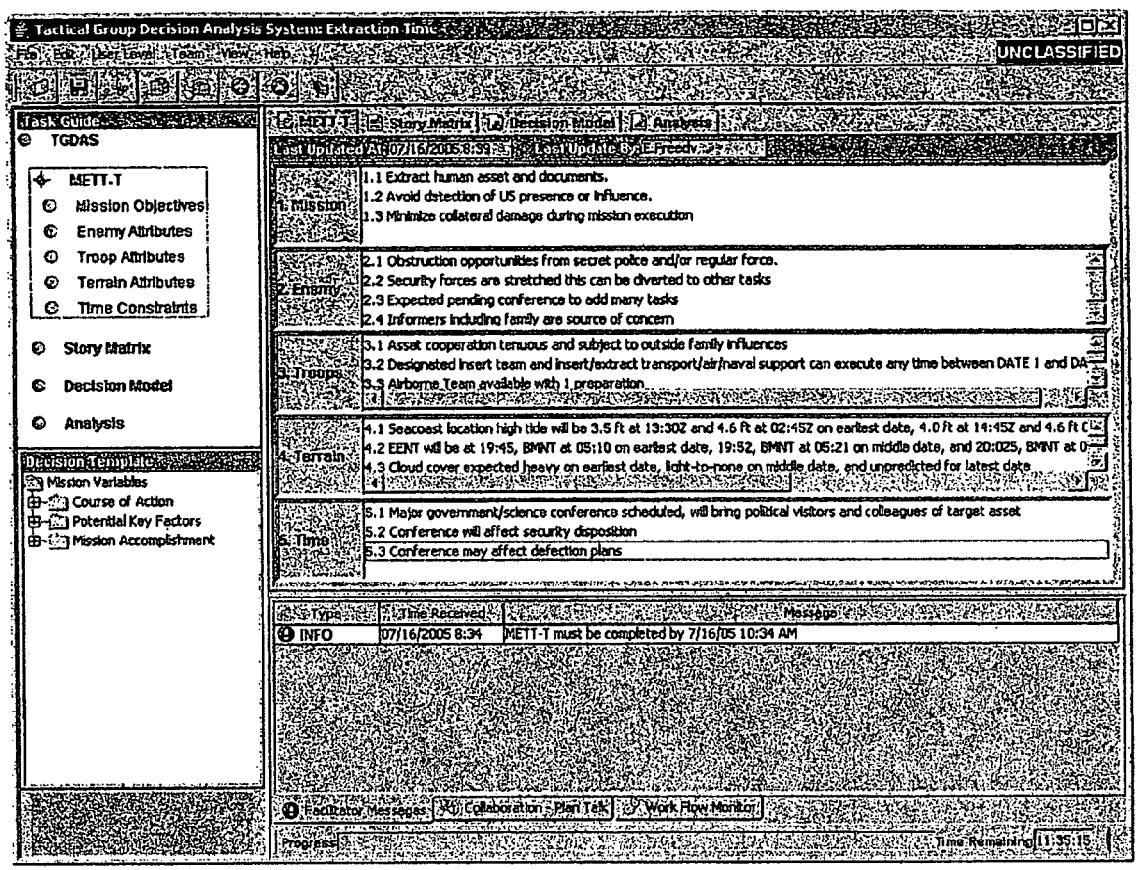
FIG. 7 is an example of a METT-T (Decision Data Base) screen according to an aspect of the invention.

In operations 614 and 616, the decision team identifies relevant factors and provides a Decision Data Base summary. According to an aspect of the invention, the factors are METT-T (Decision Data Base) factors as shown in FIG. 7. The METT-T (Decision Data Base) screen provides several operating functions to the entire decision making team:

1. Task Guide—Summarizes the decision process and shows the current point in the process;
2. Decision Template—Provides guidance regarding the important factors;
3. Communications—Shows messages received from other team members and from the Automated Facilitator 410; and
4. Decision Data Base—Provides the basic information on which the decision process will proceed. Pre-stored templates are associated with each decision type and provide a checklist of potentially relevant information for that type of decision.

By way of example in the military context, the mission involves extraction of a human asset (a scientist) together with documents and equipment from a hostile country. The example decision point involves reconsideration of previously developed contingencies for the timing of the extraction, triggered by an unexpected development. The relevant information is displayed in a METT-T summary that can be supplied from outside the team and/or supplemented by team members. Information in the METT-T summary can be linked to text in other documents. As a result, users can examine the basis for a particular answer, and alerts can be generated when and if the supporting information changes.

When the Data Base summary is satisfactory, the decision team typically moves to the story matrix function in operation 618. By way of the example shown in FIG. 7, the story matrix function is accessed using a story matrix tab. In operation 618, each of the decision team members create story matrix and (decision) options. Specifically, a story matrix screen individually presents the framework for each member of the decision team to "tell the story of the decision and its outcome" in natural, narrative form. The Story Matrix has two primary modes: A Compose Story mode and a Compare Story mode. As shown in FIG. 8, the modes are accessed by selecting corresponding tabs.

In the Compose Story mode, each of the Decision Team Members are guided by a stored Story Format and Decision Template based on the type of decision being made. In the example decision, the Story Format contains Course of Action, Key Factors and Mission Accomplishment, and the Decision Template provides further detail under those headings. The user can refer to information in the Decision Data Base (METT-T in the example) to provide references and text for the story. Elements entered by other means, such as email, in a natural mode can be manually included by copying and/or dragging and dropping the relevant text.

In the Compare Story mode, the progress of the collaborative team is displayed in terms of the major variables. Each member's story is summarized in the form of key variables as part of the Team Matrix, and the variable details of the individual stories are available in narrative form by clicking on the particular cell of the matrix. An example of the Compare Story mode is shown in FIG. 8 in which the proposed course of action (COA) for each of three decision team members are shown simultaneously.

The Automated Facilitator 410 determines when new variables must be added to the matrix as a function of individual decision team member inputs, and also helps resolve conflicts within the team concerning variables.

When the story matrix is complete in operation 618 such as using a meter, the decision team leader moves the decision team to the decision modeling function of the Model-Based Representation Module 620. In the example in FIG. 9, the decision model function is accessed by selecting the Decision Model Tab. The model-based representation layer 620 supports the decision team in formulating the influence diagram model, containing relevant probability and value parameters, from which is derived the recommended or selected plan of action—which goes back into the OP Plan of operation 600. As shown in FIG. 6, there is continuous interaction between the cognitive assessment layer 610 and the model-based representation layer 620. The model-based representation layer 620 includes an operation 622 in which the decision team creates an influence diagram model; an operation 624 in which each of the decision team members separately provide default probabilities and values for the influence diagram model; and an operation 626 in which the decision team members review the different results received from operation 624. The analyzed result of operation 626 is used in operation 602 to allow the decision team members to recommend or select a plan.

The decision analytical guidance and support layer 630 is for system guidance and support operations based on decision analytical models. Specifically the decision tree is derived from the previously defined influence diagram model according to an aspect of the invention. The decision analytical guidance and support layer 630 includes sensitivity analysis which helps determine if more information is needed. The decision analytical guidance and support layer 630 includes an operation 632 in which the system produces a decision tree; an operation 634 in which the system calculates a best course of action based upon the inputs of the decision team; and an operation 636 in which the system identifies sensitivities and any needs for information or analysis by the decision team. There is a continual interaction and feedback between the model-based representation layer 620 and the decision analytical guidance and support layer 630 such that their combined tasks flow will be described in detail below.

In operations 622 and 624, the decision team members create an influence diagram using module 406 and provide probabilities and values as part of the decision tree probability elicitation module 408. According to an aspect of the invention, the Automated Facilitator 410 automatically generates a decision model in the form of an influence diagram, which is based on the story matrix created in module 404 and variables jointly determined by the decision making team. The influence diagram is a more formal representation which explains what is going on in a particular "story." The influence diagram helps explain why a story unfolds in the way it does by representing causal and value relationships among story variables. The Automated Facilitator 410 adopts a general, default assumption that the values of intermediate story variables will be influenced by the decision variable, and that an aggregated value will be influenced by mission elements. Additional links among variables can be pre-specified in the template for the type of decision under consideration.

An example of an influence diagram is shown in FIG. 9. In the example, the node at the left represents the key decision variable (time of extraction). The central nodes represent uncertain events or states of affairs (extraction of target, extraction of material, collateral damage, and remains covert). The diamond node at the right represents an overall measure of the "goodness" of the several decision options (i.e., an aggregate indicating how well each performs). However, it is understood that additional types of nodes can be indicated and otherwise communicated to any or all of the Decision Team.

The individual decision team members interact directly with the influence diagram. Specifically, the decision team members can alter probabilities of potential courses of action at a node. Additionally, the decision team members can estimate the probability that a particular state of affairs will be achieved by a adjusting a particular decision option on a probability window according to an aspect of the invention. An example of the probability window is shown in FIG. 10.

While not required, the Probability Window can be obtained by double clicking on the influence diagram node for that state. In the example shown in FIG. 10, the individual decision team member is estimating the probabilities that safe extraction of the target will ('yes') or will not ('no') result from extraction before the conference, during the conference or after the conference. In the shown example, the decision team member enters the estimates graphically by moving either the 'yes' or 'no' slider to the estimated probability for each option. The complementary probability is automatically calculated and entered in the shown example. However, it is understood that the estimated probability can be otherwise entered and/or the complementary probability can be manually entered as need be.

Additionally, the decision team members input the values in operation 624 using the influence diagram. Specifically, each of the Decision Team Member estimates the relative priority (i.e., value) of the mission objectives affected by the decision node being evaluated using a relative priority window. According to an aspect of the invention, the Relative Priority Window includes sliders to input the relative value of each mission objective. An example of the Relative Priority Window is shown in FIG. 11. The shown example Relative Priority Window is obtained by double clicking on the aggregation icon in the influence diagram shown in FIG. 9. In the example, the decision team member indicates that the collateral damage objective has a relatively low priority and the other mission objectives have relatively high priority. However, it is understood that the values can be otherwise input according to other aspects of the invention.

The probabilities and values for the entire decision making team are merged using the following algorithm:
1. A "Discrepancy Threshold" is determined as an absolute value.
2. The inputs for all user for a given attribute in the decision model are compared "pair-wise."
3. If the difference between any pair of inputs exceeds the "Discrepancy Threshold" the Automated Facilitator prompts the users for a discussion to determine the cause of the discrepancy among the participants assignments.
4. If the no pair exceeds the "Discrepancy Threshold", the values are averaged.

Of course, the algorithm can include simple averaging, weighted averaging, averaging of central values, and some form of Delphi or voting algorithm according to aspects of the invention. However, it is understood that other algorithms can be used in addition to or instead of these algorithms.

Likewise, conflicts among team members (for example, where team members have widely differing estimates of probability or of relative priority) are flagged by the Automated Facilitator 410, which also provides methods for their resolution such as those outlined in FIG. 5 and Table 1.

In operation 632, the system produces a decision tree using the results of operation 624. According to an aspect of the invention, the system calculates a full decision tree for the decision model represented by the influence diagram. The full decision tree represents all the possible scenarios, or sequences of events, that might be generated by the causal model in the influence diagram. An example of a portion of a full decision tree is shown in FIG. 12. As shown in the example, branches emerging from chance nodes are possible values of the variable at that node. Numbers on the branches are conditional probabilities of the values given the values on the branches traversed to get to that node. A complete path through the tree starts at the root node on the left and ends with a terminal node on the right. Each path describes a possible scenario, or sequence of events, and is associated with a specific payoff or value, indicated by the boxed number next to the diamond.

For the above example involving extraction, FIG. 12 shows only a portion of the decision tree associated with the example since the full decision tree would have well over 500 paths. Thus, the full tree is too complex to display even for this simple problem. Instead, the decision tree functions as a computational device according to an aspect of the invention. The system uses the full decision tree to calculate an expected value at every node (boxed numbers), which reflects how good the situation looks on arriving at that node and facing the branching future possibilities on the right. The expected value at a node is the probability-weighted average of the values or expected values at the ends of its branches, and is computed by averaging and rolling back the tree from right to left. The decision tree is the basis of the analytical guidance and support provided as the Decision Team Member moves to the TGDAS Analysis mode in operation 626. However, it is understood that these values can be determined otherwise determined, such as using graphical or non-graphical decision evaluation techniques equivalent to decision trees.

Figure 13:
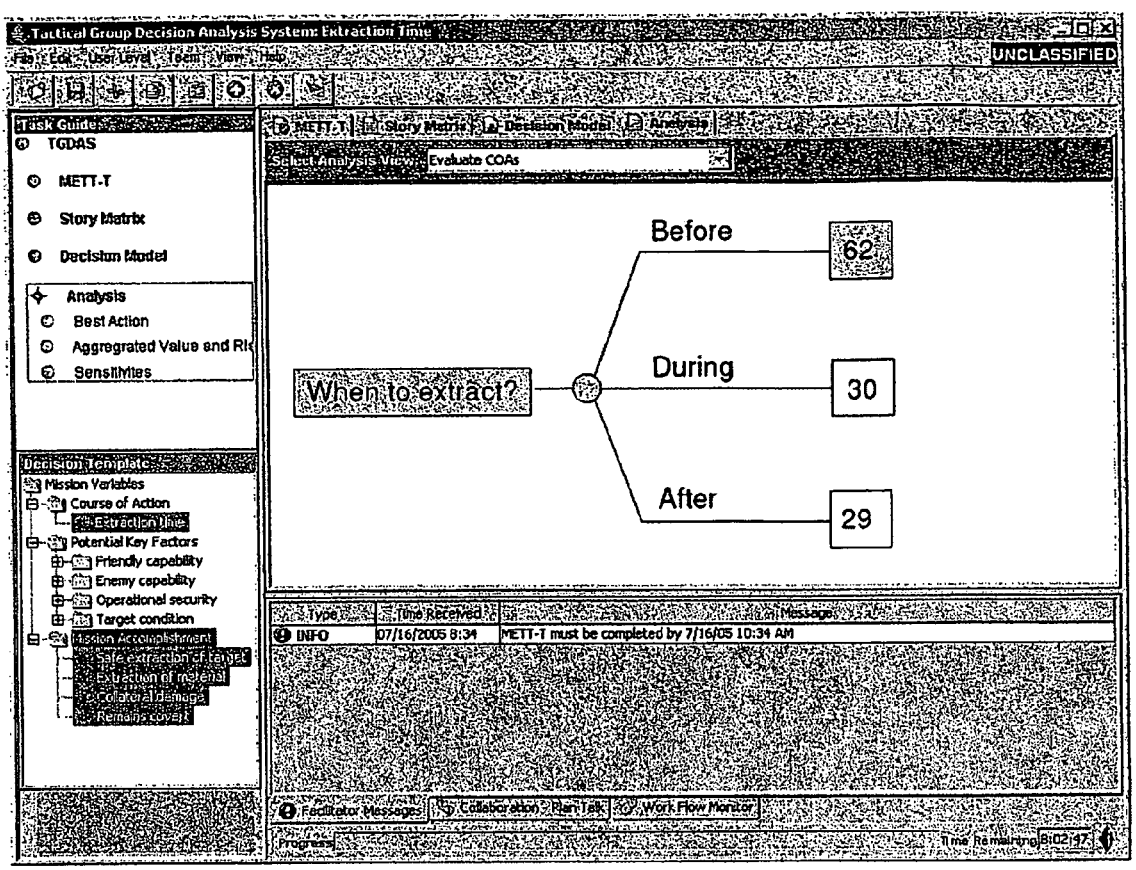
FIG. 13 is an example of a Best Course of Action Screen according to an aspect of the invention.
Figure 14:
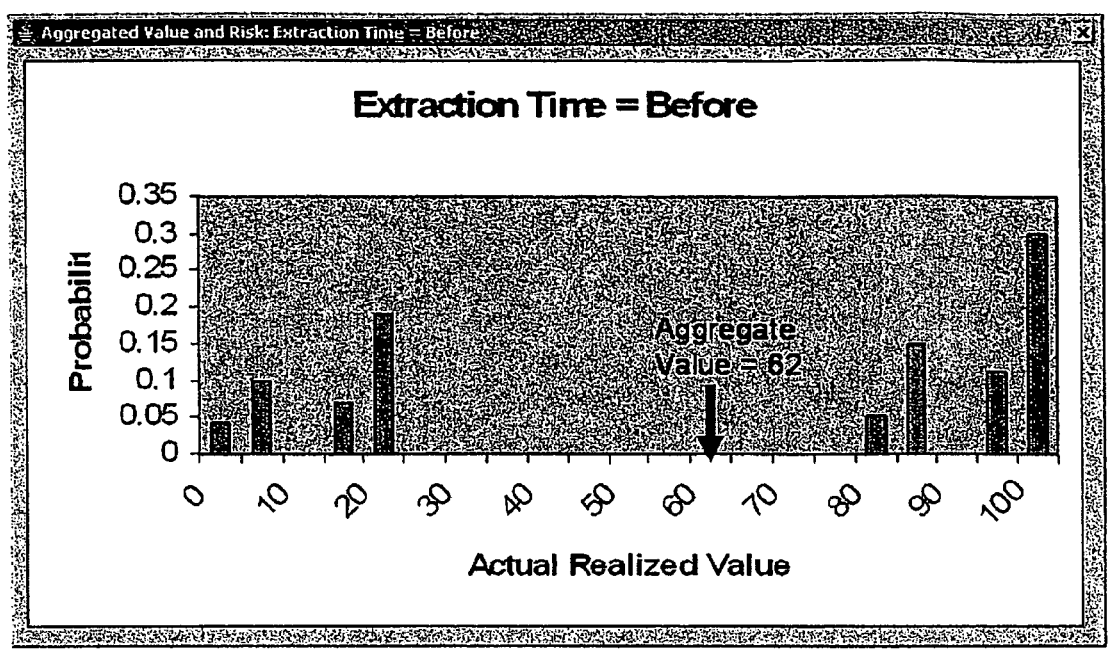
FIG. 14 is an example of a Constitution of Aggregate Value screen reflecting detail shown in the Best Course of Action Screen of FIG. 13 according to an aspect of the invention.

In operation 634, the system calculates a best action for the inputs reflected in the decision tree produced in operation 632. The result is produced and reviewed by the decision team members in operation 636 using a best course of action screen according to an aspect of the invention. An example of the best course of action screen is shown in FIG. 13. As shown in FIG. 13, the decision team members access the "best course of action" calculation from operation 634 by moving to the Analysis tab in FIG. 9, and selecting 'Evaluate COAs' in the Select Analysis View pull down menu shown in FIG. 13 while at the analysis tab. In this example, the total decision tree has been "rolled back" to the initial node to display the value (or utility) associated with each of the three options (i.e., before, during, and after). In this example, extraction before the conference has the highest utility of 62, while extraction during or after the conference have almost the same utilities and are approximately half those of the leading option.

While not required in all aspects, the system also provides additional information on the constitution of the "rolled up" utility values. According to an example shown in FIG. 14, the additional information is obtained by double clicking the particular value shown in FIG. 13. For example, in FIG. 14, the constitution of the lead value indicates that the value of 62 is actually obtained by averaging several quite low values with several very high values. This additional information indicates that the lead option of extraction before is actually a somewhat risky proposition, in which there might be a very low payoff or a very high payoff. In view of this additional information, a decision team seeking a less risky approach might select another option (even though the aggregate value is less) since this approach has a greater chance of obtaining that or a value near payoff (i.e., where the constituents were clustered more closely to the mean).

In operation 636, the system further identifies sensitivities and needs for information or analysis. According to aspects of the invention, the system performs sensitivity analysis on one or more parameters using the analysis module 409. According to aspects of the invention, the system performs one- and two-way sensitivity analysis. According to an aspect of the invention, the sensitivity analysis has views which allow the decision team members in operation 636 to select between the following sensitivity analyses: Evaluate Courses of Actions; One-Way Sensitivities; One-Way Sensitivities with Value of Information; and Two-Way Sensitivities. However, it is understood that additional parameters can be used in the sensitivity analysis to create an n-way sensitivity analysis, and that these options can be included on other tabs if included together on the system at all.

Figure 15:
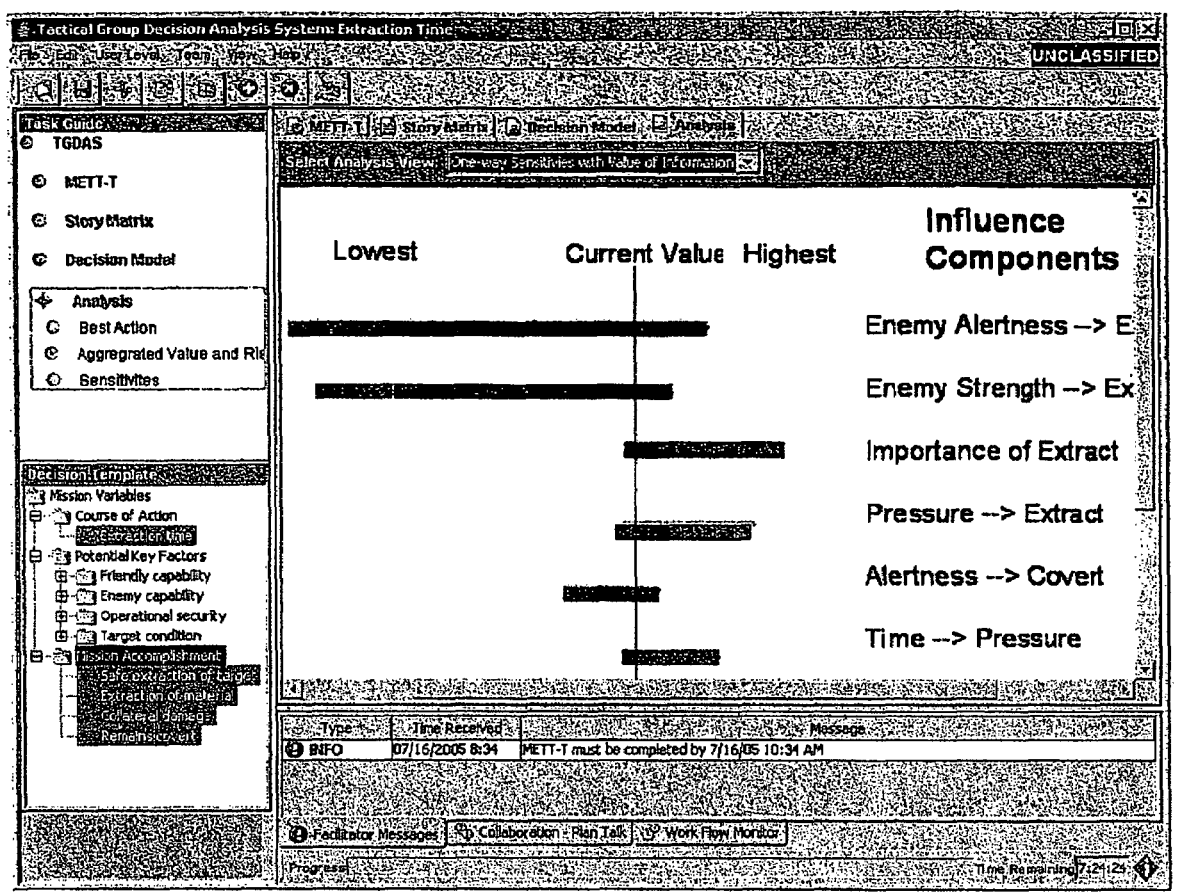
FIG. 15 is an example of a One-Way Sensitivity Analysis Screen according to an aspect of the invention.
Figure 16:
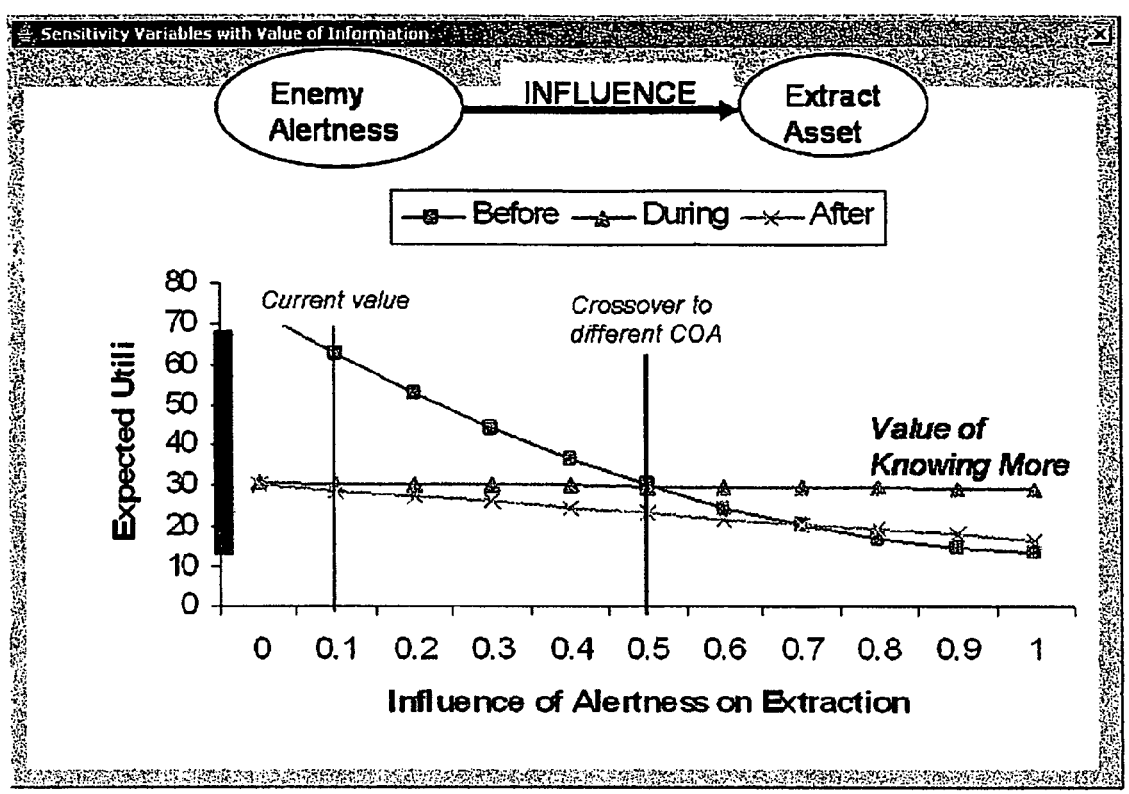
FIG. 16 is an example of a One-Way Sensitivity Window reflecting the contents of the One-Way Sensitivity Analysis Screen according to an aspect of the invention.

As shown in the example in FIG. 15, the one-way sensitivity analysis with value information is displayed using a one-way sensitivity analysis screen for analysis in operation 636. In the shown example, the sensitivity analysis screen summarizes the one-way sensitivities with value of information analysis in the form of a "Tornado Diagram." Tornado diagrams provide a broader view of how parameter values affect both the aggregated value and decisions. The abscissa measures Aggregated Value, and each bar corresponds to a particular parameter. The width of the bar represents the potential influence on aggregated value of changes in the parameter. More specifically, it represents the change in aggregated value that results from changing the parameter setting from its lowest to its highest level, leaving all other parameter settings unchanged. Parameters are arranged from top to bottom in order of their influence. The vertical line is the aggregated value given current settings for all the parameters (i.e., the value shown in FIG. 13). The graph looks like a "tornado" with the largest bars at the top and the smallest at the bottom. However, it is understood that the parameter values can be otherwise displayed and in other orders according to aspects of the invention.

While not required in all aspects, the Tornado Diagram shown in the Sensitivity Analysis Screen in FIG. 15 has the additional benefit of showing the proportional value of the additional information (the lighter part of bar) verses the currently available information (darker part of bar).

In a further aspect of the invention, the decision team members can click on the corresponding bar in the tornado diagram to open a particular parameter to view a corresponding graphical one-way sensitivity analysis for that displayed bar. In the example of in FIG. 16, the enemy alertness bar of FIG. 15 is selected so as to display a graphical one-way sensitivity for the most influential parameter: the probability of mission element success for best case enemy capability. The analysis graphically displayed in FIG. 16 allows the system to indicate that at the current value assigned by the decision team to the influence of alertness on extraction (0.1), the extraction before the conference is clearly the preferred option. But if the estimate of this influence would change to 0.5 or above, the best course of action would be extraction during the conference.

Through comparison of the one-way sensitivity analysis with the relevant bar in the tornado diagram, the system shows that the height of the bar is the same as the difference between aggregated value when the parameter is at its lowest level and aggregated value when the parameter is at its highest level—given that the best option is chosen for each parameter setting. The value of additional information is the maximum difference between the best alternative option and the current option according to an aspect of the invention.

In operation 636, the system displays a two-way sensitivity analysis in order to compare two parameters according to an aspect of the invention. Specifically, the system opens a window that allows the decision team member to analyze the effect on the choice of an option of the influence of any two selected variables on a selected mission objective. Of course, it is understood that additional variables could be selected in order to provide an n-way sensitivity analysis.

Figure 17:
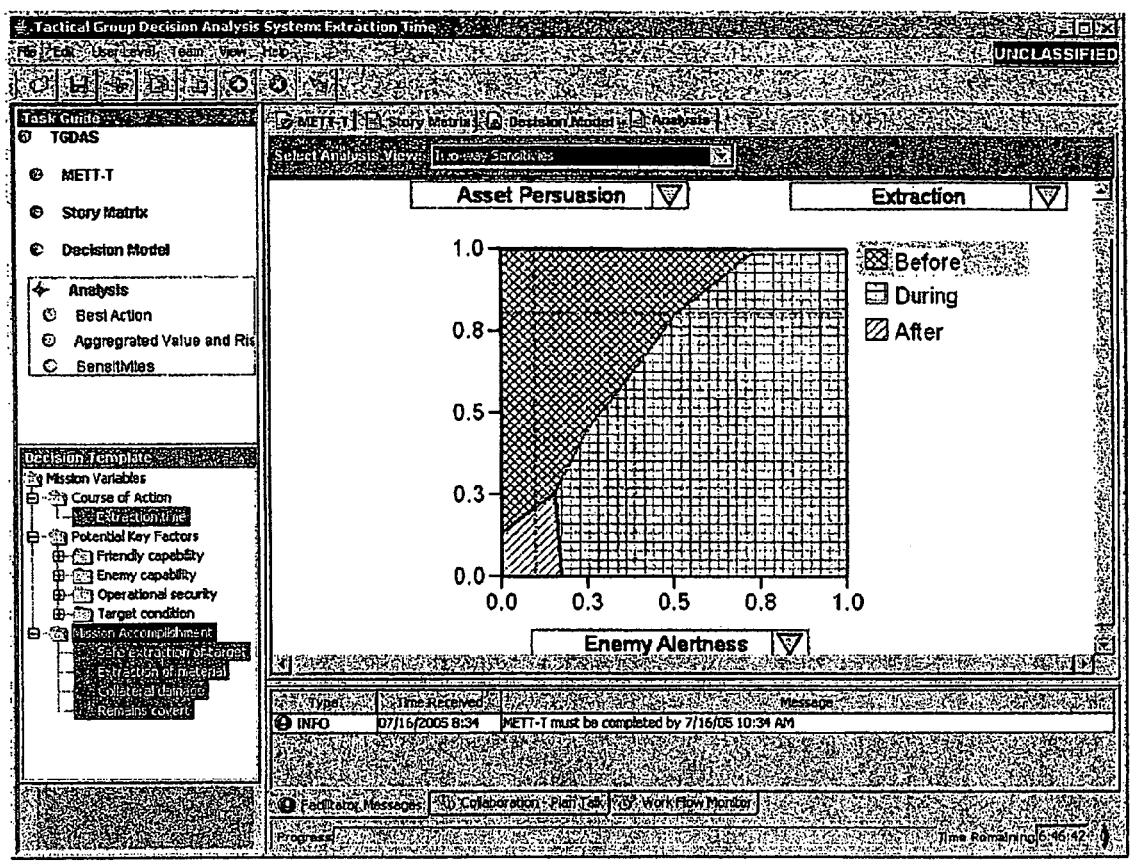
FIG. 17 is an example of a Two-Way Sensitivities Analysis Window according to an aspect of the invention.

An example of the two-way sensitivities analysis view is shown in FIG. 17. In FIG. 17, the view shows the combined effect on an option selection of the influence of asset persuasion on asset extraction (estimated currently at 0.84) and enemy alertness on asset extraction (estimated currently at 0.10). The example view shows that the intersection of the currently estimated values falls in the domain of extraction before the conference (which is highlighted), and that the estimates of these two influences would have to change significantly before the domain of another option was entered.

As such, in operation 636, the decision team member can explore the entire sensitivity space by selecting other variables from the three pull down menus. It is understood that additional numbers of pull down menus can be provided and that other mechanisms can be used to allow the Decision Team to review the sensitivity space.

In operation 626, the decision team members analyze the overall results. While not required in all aspects, the overall results can be displayed in the planning software at the decision point as part of a properties display. However indicated, the decision team members use the full capabilities of the system to analyze the results of the guided decision making process. Based on the results of the COA and sensitivity analyses performed in the decision analytical guidance and support level 630 and if time allows, the decision team may cycle through the process again. If the deadline is imminent, the decision team can use the results of a one-pass analysis. Further, if additional analysis is to be performed, it is understood that another team could be selected for this supplemental analysis as need be.

In operation 602, the decision team members review the results of operation 626 and recommend or select a plan/ course or action. Depending on the organizational protocol, the decision team members can select or recommend a course of action by using a consensus method or by assigning the final decision to the decision team leader according to aspects of the invention.

In operation 604, the decision team leader reviews the recommendations of the decision team members from operation 602, and prepares a course of action report. The decision team and/or the decision team leader will then prepare a Course of Action report for the record or for the next organizational level using a format suggested by the system or another standard format. If the course of action report is not acceptable to the decision team leader, the decision team leader can revise the OP plan and SOFTools Decision Point in order to begin the analysis again at operation 600 with the same or other time. By way of example, when using a planning program such as SOFTools, the recommended decision can be inserted into the decision point properties window that is associated with the corresponding decision point icon (DP1) along with references and links to any TGDAS analysis record or report. However, it is understood that the course of action report can be otherwise provided. Moreover, it is understood that, where the decision team leader is not utilized in the organizational capacity (such as where decisions are made on a consensus), operation 604 need not be performed.

In the described example, the system itself does not decide on the best option. Instead the system provides tools that support the decision team in recommending a plan or course of action for the team leader's final choice. However, it is understood that the results of the system can be automatically implemented. Further, the results can be saved for later analysis, such as through review of after action reports, in order to improve the models and/or default parameters in the system.

According to an aspect of the invention, naturalistic decision making and formal decision analysis are fused through the use of "stories" to define COA and decision factors, the use of decision templates to build stories, and/or the use of automatic transition from stories to influence diagrams.

According to an aspect of the invention, an automated decision support facilitator performs workflow and time management of the decision process, merges individual stories and models into an aggregate group model, performs conflict detection and resolution measure invocation, and alerts the team of key information change which affect variable assumptions.

According to an aspect of the invention, sensitivity analysis is performed, including multi-way sensitivity analysis such as two-way sensitivity across selected variables in the decision model, with an alert of information severity based on sensitivity.

According to aspects of the invention, the system and method will help improve both the efficiency and effectiveness of decision making by enabling different team members to communicate experience-based judgments directly in a logically coherent framework without having to become specialists in decision theory. The system is expected to provide significant improvements in the speed and success rate of decisions as well as mutual knowledge (i.e., knowledge of one and another's knowledge) and coordination among members of a decision making team, especially in a time constrained tactical decision making environment.

According to aspects of the invention, the system and method can also be customized for a wide range of other tactical decision domains and levels of command, and will be particularly useful in counter-terrorism and asymmetric warfare contexts. Furthermore, aspects of the invention will be equally useful in non-military contexts, including tactical decision making by business groups, civil agencies, city planners, transportation agencies, police and fire-fighters, homeland security forces, managing shipping and logistics, product design development, litigation scheduling, resolving budgetary or direction issues for a corporation, or other like issues in which group decision making is required and conflicts need efficient resolution.

While aspects of the invention provides a comprehensive system for supporting real-time planning and decision-making that is easy to use by collaborative groups without the help of an expert facilitator, it is understood that expert facilitators can be used with the system or elements of the system in other aspects of the invention.

Additionally, while not required in all aspects, aspects of the invention can be implemented using computer readable media having instructions for performing all or elements of the inventions using one or more general or special purpose computers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An automated facilitator for use in structuring a group decision process using end user collaboration units through which corresponding stories are entered and feedback is provided, the facilitator comprising:

at least one database which stores models for problem solving; and at least one automated facilitation server which receives information on a problem to be resolved, receives the stories from the end user collaboration units relating to the problem to form a story matrix, translates the story matrix into an influence diagram and/or decision tree displayed on the end user collaboration units using the stored models, provides alerts of divergences to be resolved by the end user collaboration units to resolve the problem according to the stored models, updates the displayed influence diagrams and decision trees according to feedback received from the end user collaboration units due to the alert using the stored models, and provides a best solution based upon the updates which indicates a sensitivity of the solution to changes in parameters of the story matrix.

2. The automated facilitator according to claim 1, wherein the at least one automated facilitation server utilizes a Modified Petri Net formalism to resolve the problem.

3. The automated facilitator according to claim 1, wherein:

the at least one database comprises an ontology knowledge database, and the at least one automated facilitation server includes a concept extraction tool to generate semantic mappings from textual data entered using the stories to domain an ontology which defines a decision problem space and which is used to generate a machine understandable knowledge representation stored in the ontology knowledge database.

4. The automated facilitator according to claim 3, wherein the at least one automated facilitation server includes a module comprising a set of context aware agents and/or artificial intelligent (AI) utilities which use the ontology knowledge database to aid the end user collaboration units to eliminate options within the decision tree.

5. The automated facilitator according to claim 4, wherein the module includes:

a doctrinal rule validation and analysis unit to select a doctrinal template based upon the stories entered into the end user collaboration units and to use the selected doctrinal template to combine the stories in the story matrix.

6. The automated facilitator according to claim 4, wherein the module includes a constraint detection agent unit which detects external constraints relative to one or more variables of the problem and provides an alert through the end user collaboration units where there is a conflict between the one variable and the external constraints.

7. The automated facilitator according to claim 4, wherein the module includes a data assumption monitoring agent which monitors new information that impacts an assumption of the decision process and alerts the end user collaboration units of the new information.

8. The automated facilitator according to claim 1, wherein the at least one automated facilitation server flags elements of the story having discrepancies, guides the end user collaboration units to resolve the discrepancies, and constructs the story matrix when the discrepancies have been resolved by the end user collaboration units.

9. The automated facilitator according to claim 4, wherein the module includes an adaptive probability aid agent that assigns initial probabilities to nodes of the influence diagram.

10. The automated facilitator according to claim 1, wherein the at least one automated facilitation server detects nodes of the influence diagram, and allows initial probabilities to be altered by the end user collaboration units according to an extent that the probability will occur during resolution of the problem.

11. The automated facilitator according to claim 10, wherein the at least one automated facilitation server uses the altered probabilities for the detected nodes of the influence diagram to construct a decision tree for each potential outcome with a degree of probability for that outcome as indicated by the altered probabilities.

12. The automated facilitator according to claim 10, wherein the at least one automated facilitation server requires the end user collaboration units to prioritize a relative importance of each node in resolving the problem, and uses the prioritized nodes and the altered probabilities for the detected nodes of the influence diagram to construct a decision tree for each potential outcome with a degree of probability for that outcome as indicated by the altered probabilities and prioritized nodes.

13. The automated facilitator according to claim 12, wherein the at least one automated facilitation server constructs a best course of action according to the probabilities and priorities reflected in the decision tree.

14. The automated facilitator according to claim 13, wherein the at least one automated facilitation server provides a sensitivity analysis for variables in the story matrix to determine a relative impact of a change in one of the variables on the best course of action according to the probabilities and priorities reflected in the decision tree.

15. The automated facilitator according to claim 14, wherein the at least one automated facilitation server determines a time limit for reaching a resolution of the problem, and alerts the end user collaboration of an amount of time remaining to resolve the problem.

16. The automated facilitator according to claim 1, wherein the end user collaboration units comprise an internet browser interface or an application program or a combination thereof connected to the at least one automated facilitator across one or more networks.

17. The automated facilitator according to claim 1, wherein the at least one database comprises a story maintenance data database to store the story matrix and stories and to maintain the story matrix and stories during the decision process, and the at least one automated facilitation server and the end user collaboration units interact with the stored and maintained story matrix and stories by accessing the story maintenance data database.

18. The automated facilitator according to claim 1, wherein at least one of the end user collaboration units includes a dynamic situation assessment module including a decision template to organize the information of the story stored at the at least one database, a story matrix module which displays the story matrix built using an appropriate doctrinal template retrieved by the at least one automated facilitation server from the at least one database according to attributes of the decision template, an influence diagram module which displays the influence diagram generated by the at least one automated facilitation server based on the story matrix and variables jointly determined by a decision making team to help explain why a story unfolds in the way it does by representing causal and value relationships among story variables, a decision tree probability elicitation module which provides probabilities and values regarding the story variables and transmits input probabilities and values regarding the story variables to the at least one automated facilitation server for use in constructing the best solution, and an analysis module which displays the best solution and a sensitivity analysis provided by the at least one automated facilitation server.

19. The automated facilitator according to claim 18, wherein the decision template is in a Motives, Barriers, Resources, and, Timing (MBRT) format and/or a Mission, Enemy, Troops, Terrain-Time (METT-T) format.

20. An automated method for supporting real-time planning decision making by members of a group, the method comprising:

gathering information in the form of stories from each of a plurality of end user collaboration units regarding resolution of a problem;

while sharing the gathered information among the group through end user collaboration units, utilizing at least one server to create a story matrix combining elements of the stories;

continuously accepting and incorporating feedback at the at least one server from each of the end user collaboration units regarding probabilities and/or relative importance of selected elements of the story matrix to construct a decision tree connecting all possible outcomes of the elements according to a Modified Petri Net discrete event formalism which the at least one server displays at the end user collaboration units;

providing the end user collaboration units with a best resolution of the problem based upon the decision tree and the probabilities and/or relative importance of the selected elements as determined by the at least one server from the input probabilities and/or relative importance; and providing by the at least one server the end user collaboration units with a sensitivity analysis for each of the selected elements to detect an effect of varying the selected elements on the best resolution.

21. The method of claim 20, wherein said gathering of information further comprises continuously tracking real-world events and alerting the end user collaboration units of a discrepancy between the real-world events and any of the elements of the stories.

22. The method of claim 20, further comprising performing a continuous analysis of said gathered information to provide alerts to the end user collaboration units regarding problem presentation flaws, conflicts in problem/situation understanding, value conflicts, normative group decision criteria, or combinations thereof.

23. At least one computer readable medium for implementing the method for supporting real-time planning decision of claim 20 executable by one or more processors.

24. A system for supporting real-time planning and decision making by members of a group, comprising:

an automated facilitator implemented as a computer hardware or software system which guides a planning and decision making process by monitoring and controlling the decision process, enforcing a proper decision methodology by coordinating activities of end-user collaboration units, and providing a best result based upon the coordinated activities;

the end-user collaboration units which enable interaction among the group members and with the automated facilitator, elicits and captures corresponding group members stories, and interacts with the automated facilitator to revise the captured stories; and a services and data unit which interacts with the end-user collaboration units and the automated facilitator to maintain the stories and other related input data required in the decision making process, and provides intelligent decision services which use artificial intelligence and context aware automated agents to apply decision-independent information to a situation so as to enhance decision model-based decision tools, wherein:

the automated facilitator and services and data units are implemented on one or more servers and databases, and the end-user collaboration units are implemented as client applications which connect to the automated facilitator and services and data units over one or more networks, and/or web server applications accessed by group members using a web browser over one or more networks, the automated facilitator and services and data units comprise a story collection unit which elicits and captures individual member assessments of the situation using a pre-determined template;

a story matrix module which consolidates the captured individual member assessments and analyzes the result for conflicts in member stories;

a feedback unit which, based on the kinds of conflicts noted by the story matrix module, prompts the group members to reconsider or defend their initial assessments further using the story collection unit;

a synthesis unit which forms an aggregate decision model and calculates a resulting decision;

a workflow unit which considers time requirements and quality of the resulting decision and which decides if further feedback/synthesis is necessary; and a result unit which presents the current best result to a group leader to either be accepted or to have time constraints adjusted so that the decision may be considered further.

25. The automated facilitator according to claim 1, wherein the each story comprises information provided in narrative form from each of the end user collaboration units relating to the problem to be resolved to be compiled into the story matrix according to a naturalistic decision making analysis.

26. The automated facilitator according to claim 25, wherein the story is submitted through a corresponding template having fields associated with each decision type and which provides a checklist of relevant information for each decision type.

* * * * *

UNITED STATES PATENT AND TRADEMARK OFFICE
CERTIFICATE OF CORRECTION

| | | |
|---|---|---|
| PATENT NO. | : 7,321,883 B1 | |
| APPLICATION NO. | : 11/498884 | |
| DATED | : January 22, 2008 | |
| INVENTOR(S) | : Amos Freedy et al. | |

It is certified that error appears in the above-identified patent and that said Letters Patent is hereby corrected as shown below:

Title Page, Item (54), Title, change
"FACILITATOR USED IN A GROUP DECISION PROCESS TO SOLVE A PROBLEM ACCORDING TO DATA PROVIDED BY USERS" to
--A COGNITIVE-BASED TACTICAL DECISION ANALYSIS SYSTEM FOR COLLABORATIVE GROUPS--.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,321,883 B1 | Page 1 of 1 |
| APPLICATION NO. | : 11/498884 | |
| DATED | : January 22, 2008 | |
| INVENTOR(S) | : Amos Freedy et al. | |

It is certified that error appears in the above-identified patent and that said Letters Patent is hereby corrected as shown below:

Title Page, Item (54) and Column 1, lines 1-4, Title, change "FACILITATOR USED IN A GROUP DECISION PROCESS TO SOLVE A PROBLEM ACCORDING TO DATA PROVIDED BY USERS" to --A COGNITIVE-BASED TACTICAL DECISION ANALYSIS SYSTEM FOR COLLABORATIVE GROUPS--.

This certificate supersedes the Certificate of Correction issued November 18, 2008.

Signed and Sealed this

Ninth Day of December, 2008

JON W. DUDAS
*Director of the United States Patent and Trademark Office*